United States Patent [19]

Maruyama et al.

[11] Patent Number: 5,023,708
[45] Date of Patent: Jun. 11, 1991

[54] COLOR IMAGE FORMING APPARATUS FOR SUPERPOSING A PLURALITY OF IMAGES

[75] Inventors: Hiroyuki Maruyama; Tadao Kishimoto; Toshifumi Isobe; Jun Yokobori, all of Tokyo, Japan

[73] Assignee: Konica Corporation, Tokyo, Japan

[21] Appl. No.: 474,224

[22] Filed: Feb. 2, 1990

Related U.S. Application Data

[63] Continuation of Ser. No. 121,528, Nov. 17, 1987, abandoned.

[30] Foreign Application Priority Data

Nov. 20, 1986 [JP] Japan ................... 61-277739
Nov. 28, 1986 [JP] Japan ................... 61-285340

[51] Int. Cl.$^5$ ............................................ H04N 1/46
[52] U.S. Cl. ..................... 358/75; 346/157; 355/244; 355/327
[58] Field of Search ............ 358/75; 355/3 DR, 4, 355/7, 14 R; 346/108, 157

[56] References Cited

U.S. PATENT DOCUMENTS

| 4,403,848 | 9/1983 | Snelling ................... 355/327 |
| 4,547,062 | 10/1985 | Fujiwara .................. 355/14 R |
| 4,558,356 | 12/1985 | Toda et al. ................ 358/75 |
| 4,731,638 | 3/1988 | Cherian ................... 355/14 R |

FOREIGN PATENT DOCUMENTS

| 50-12370 | 4/1975 | Japan . |
| 52-37377 | 9/1977 | Japan . |
| 57-167034 | 10/1982 | Japan . |
| 58-72963 | 2/1983 | Japan . |
| 59-221166 | 12/1984 | Japan . |
| 51178 | 3/1986 | Japan . |
| 61-118775 | 6/1986 | Japan . |
| 189066 | 8/1986 | Japan . |

*Primary Examiner*—Howard W. Britton
*Attorney, Agent, or Firm*—Nilles & Nilles

[57] ABSTRACT

A color image forming apparatus wherein a color image is formed by rotating plural times an image retainer and repeating a latent image formation and a development. The start timing of an image forming cycle is controlled by using one of reference signals corresponding to one of a plurality of predetermined positions on the image retainer and the start timing of another image forming cycle is controlled by using another of the reference signal.

5 Claims, 27 Drawing Sheets

65:

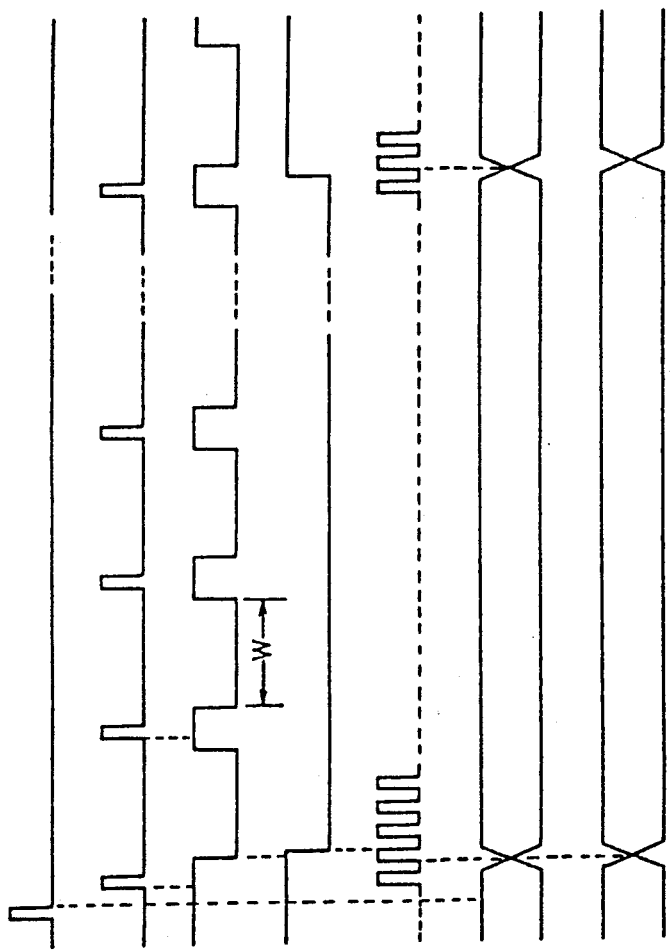
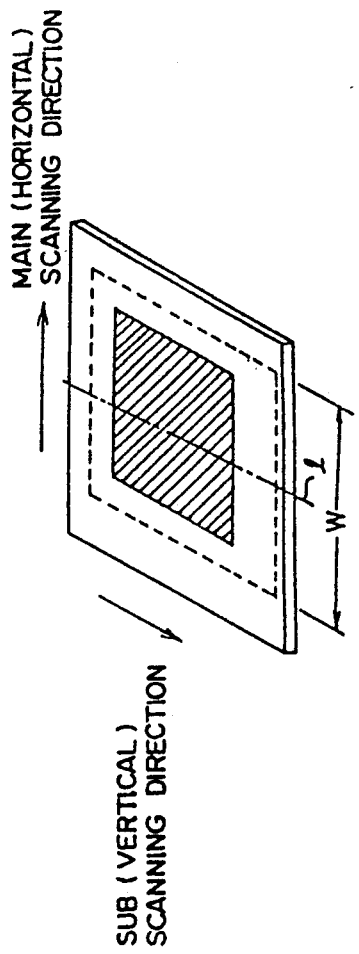
FIG. 6A DOCUMENT READ START
FIG. 6B HORIZONTAL SYNCHRONOUS SIGNAL H-SYNC
FIG. 6C HORIZONTAL VALID RANGE SIGNAL H-VALID
FIG. 6D VERTICAL VALID RANGE SIGNAL V-VALID
FIG. 6E SYNCHRONOUS CLOCK CLK
FIG. 6F IMAGE SIGNAL R
FIG. 6G IMAGE SIGNAL CY
FIG. 7

FIG. 10

```
                                    BLACK (BK)
                                               → VC/(VR+VC)
          FFFFFFFFFFFFFFFFFF FFFFFFFFFFFFFFFFFF
          FFFFFFFFFFFFFFFFFF FFFFFFFFFFFFFFFFFF
          FFFFFFFFFFFFFFFF EE FFFFFFFFFFFFFFFFFF
          EEEEEEEEEEEE FFF DD EE FFFFFFFFFFFFFFF
          DDDDDDDDDDDD EE FF CC EEEEEEEEEEEEEEEE
          CCCCCCCCCCCC EEE BB DDDDDDDDDDDDDDDDD
          BBBBBBBBBBBB CCCC BB CCCCCCCCCCCCCCCC
RED (R)   AAAAAAAAAB BBCCC AA BBBCCCCCCCCCCCCC
          999999999999 BBBB 99 8BBBBBBBBBBBBBBB
          999999999999999 99 8AAAAAAAAAAAAAAA
          888888888888888 99 8AAAAAAAAAAAAAAA
          77777777777777 88 888888888888888
          6666666677777 88 6667777777777
          666666667777777 77 55667777777777
          66666666666667 77 5566666666666666
          5555555555557 77 5566666666666666
          5555555555555 66 455555555555555
          4444444445555 66 455555555555555
          4444444445555 55 344444444444444
          3333333355555 55 344444444444444
          33333333333 5 44 333333333333333
          33333333333 5 44 333333333333.33
          222222222 25 33 2222222222222
          222222222222 33 2222222222222
          222222222222 33 2222222222222
          222222222222 22 1111111111111111
          1111111111111 22 1111111111111111
          1111111111111 11 1111111111111111
          1111111111111 11 1111111111111111
          000000000000000 11 00000000000000
          000000000000000 00 00000000000000
VR+VC ↓   000000000000000 00 00000000000000
                                    BLUE (B)
```

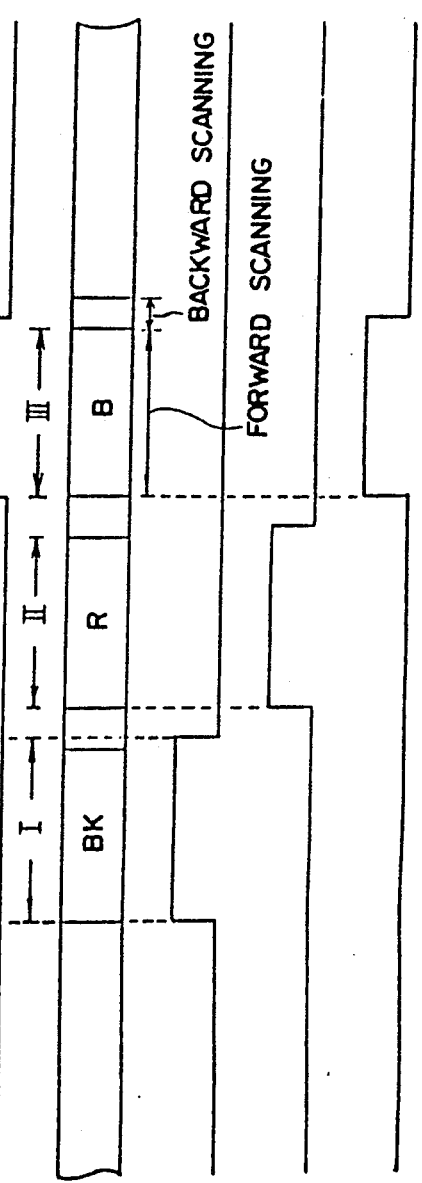
FIG. 12A IMAGE READING
FIG. 12B IMAGE RETAINER
FIG. 12C DEVELOPING BIAS BK
FIG. 12D DEVELOPING BIAS R
FIG. 12E DEVELOPING BIAS B
FIG. 12F EXPOSURE PROCESS
FIG. 12G GATE SIGNAL G1
FIG. 12H GATE SIGNAL G2
FIG. 12I GATE SIGNAL G3

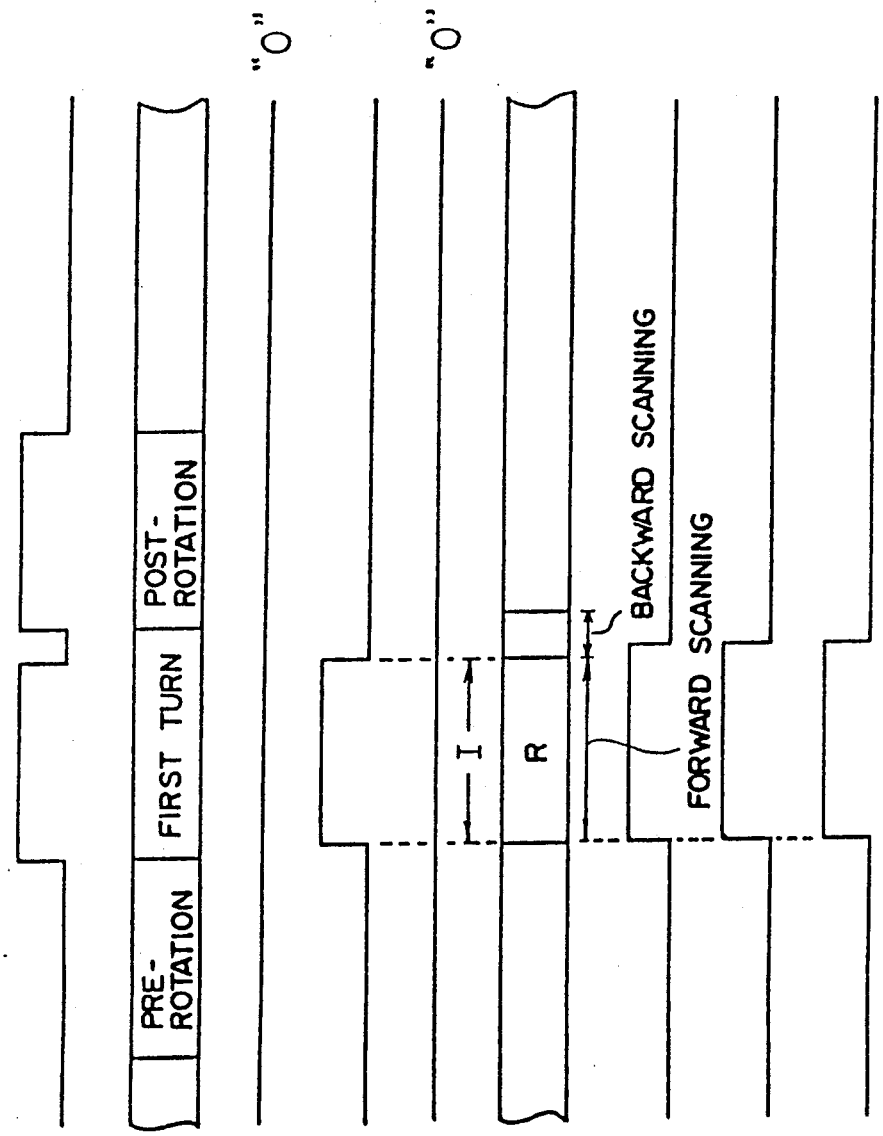

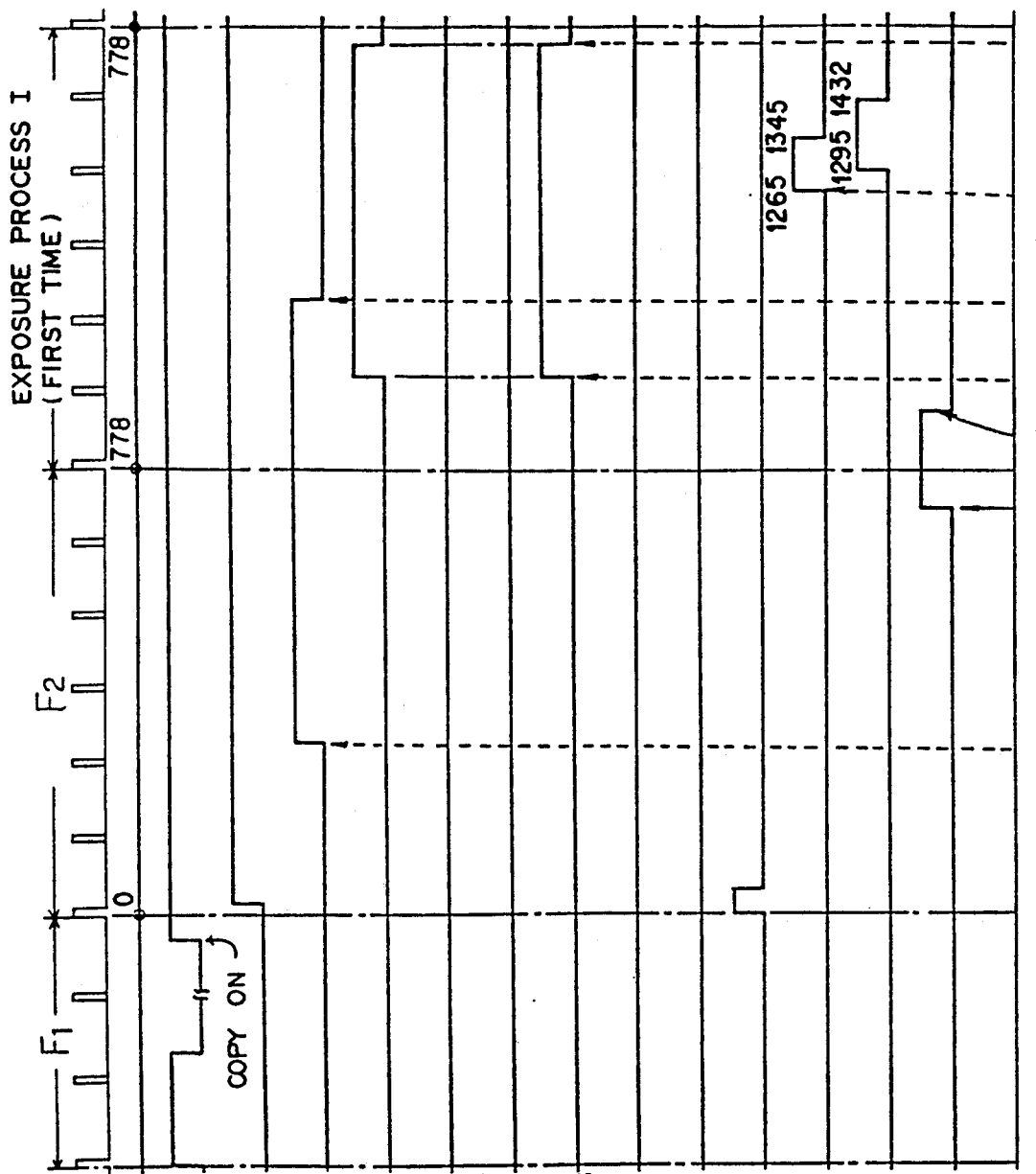

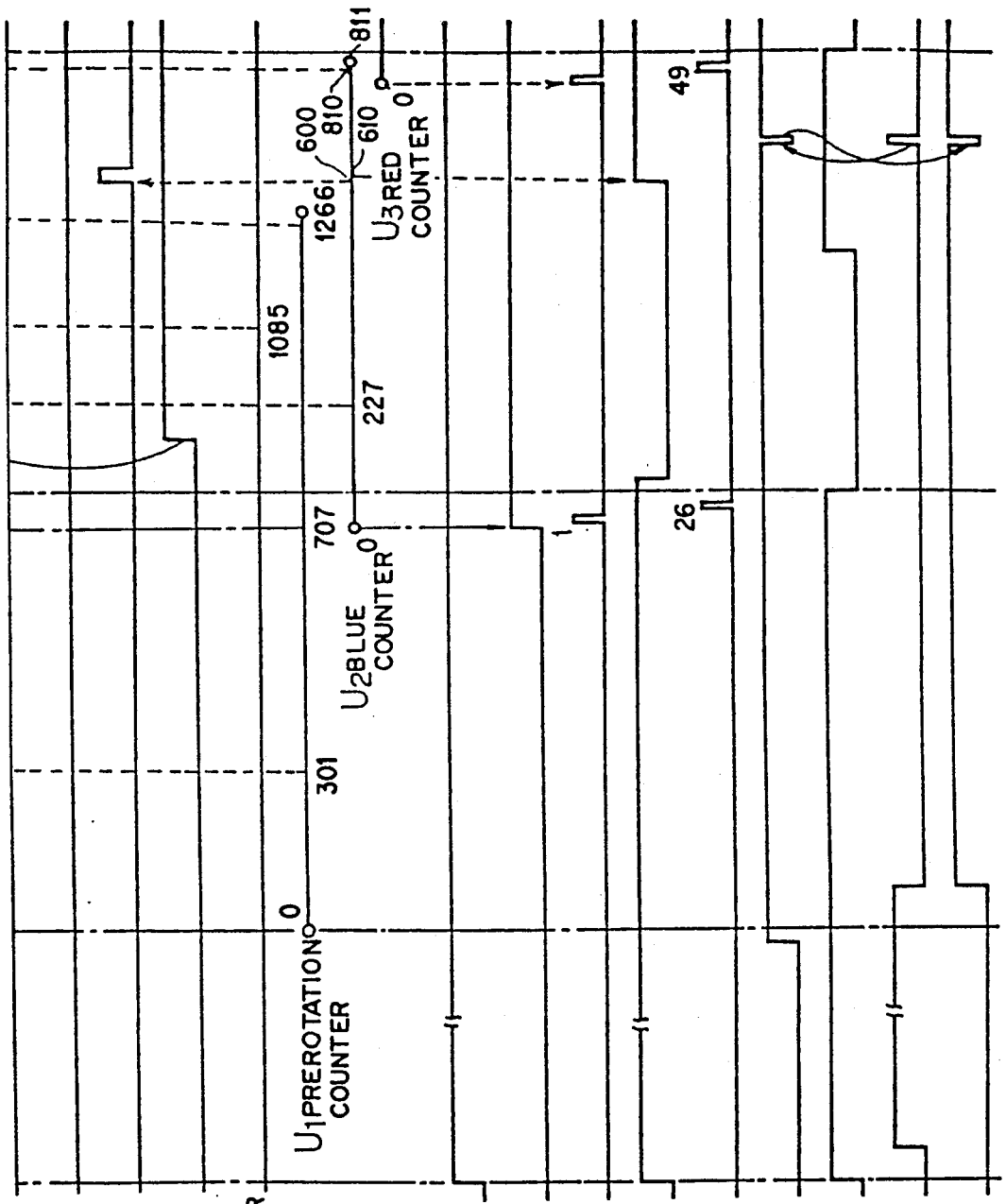

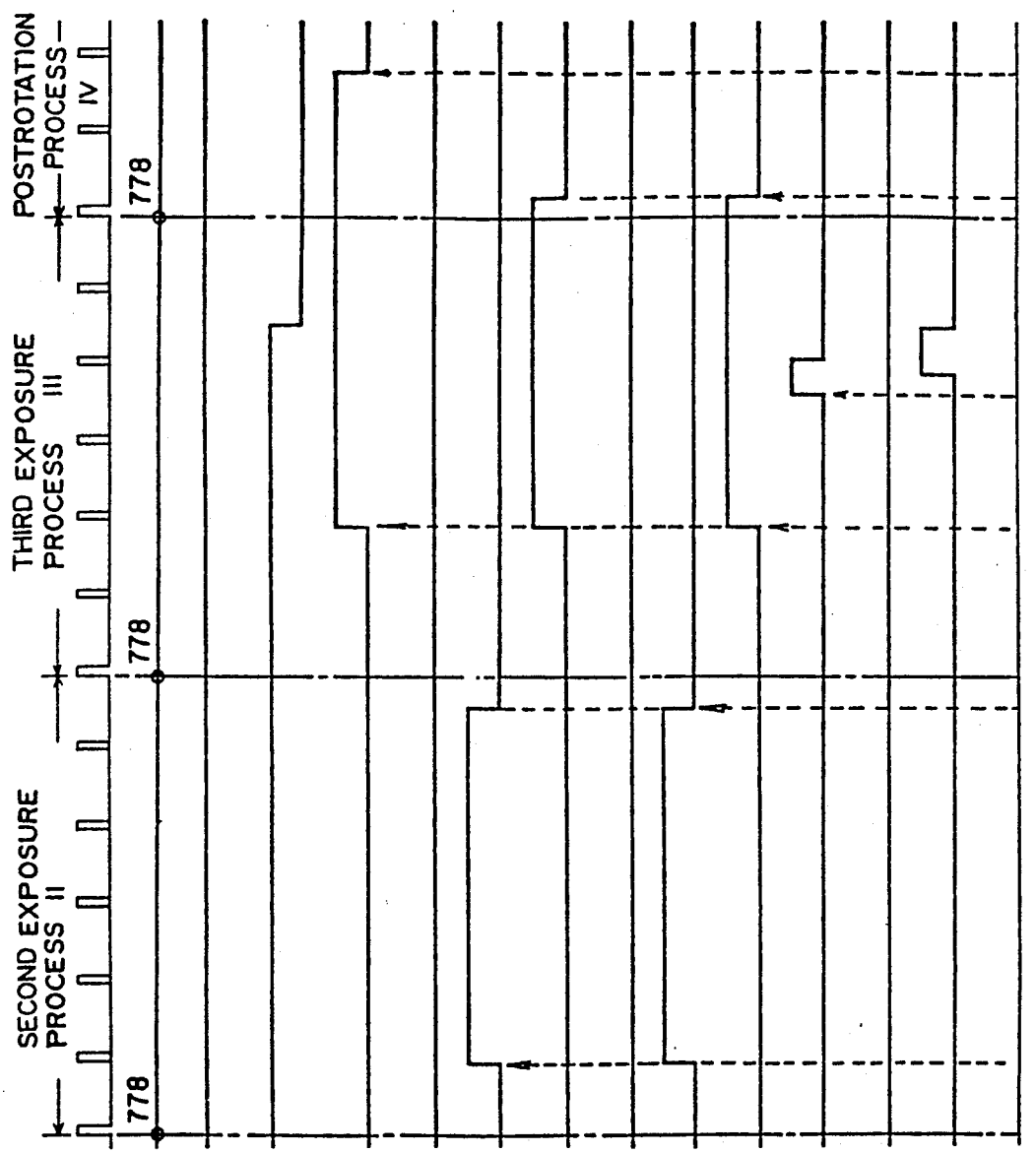

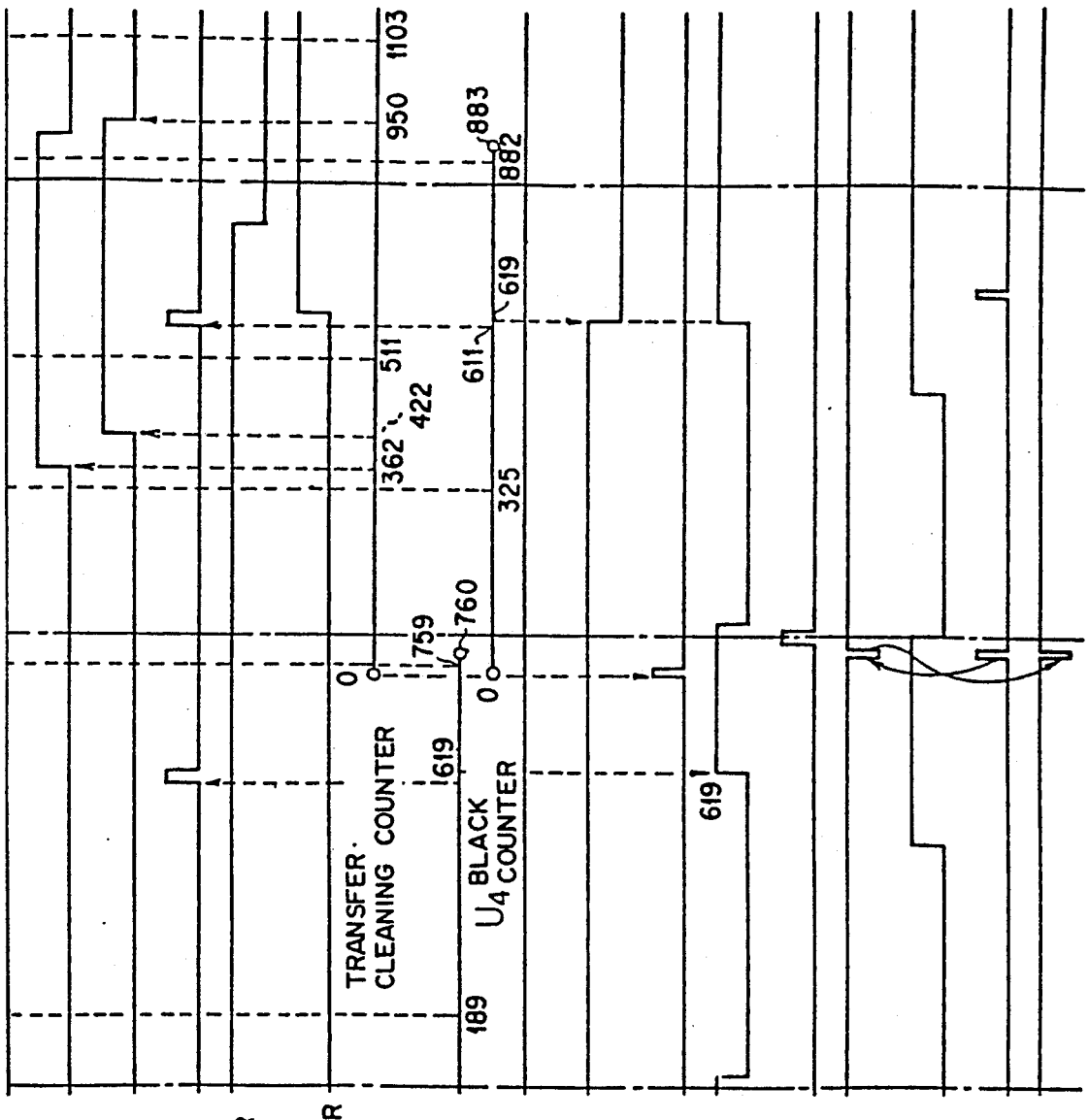

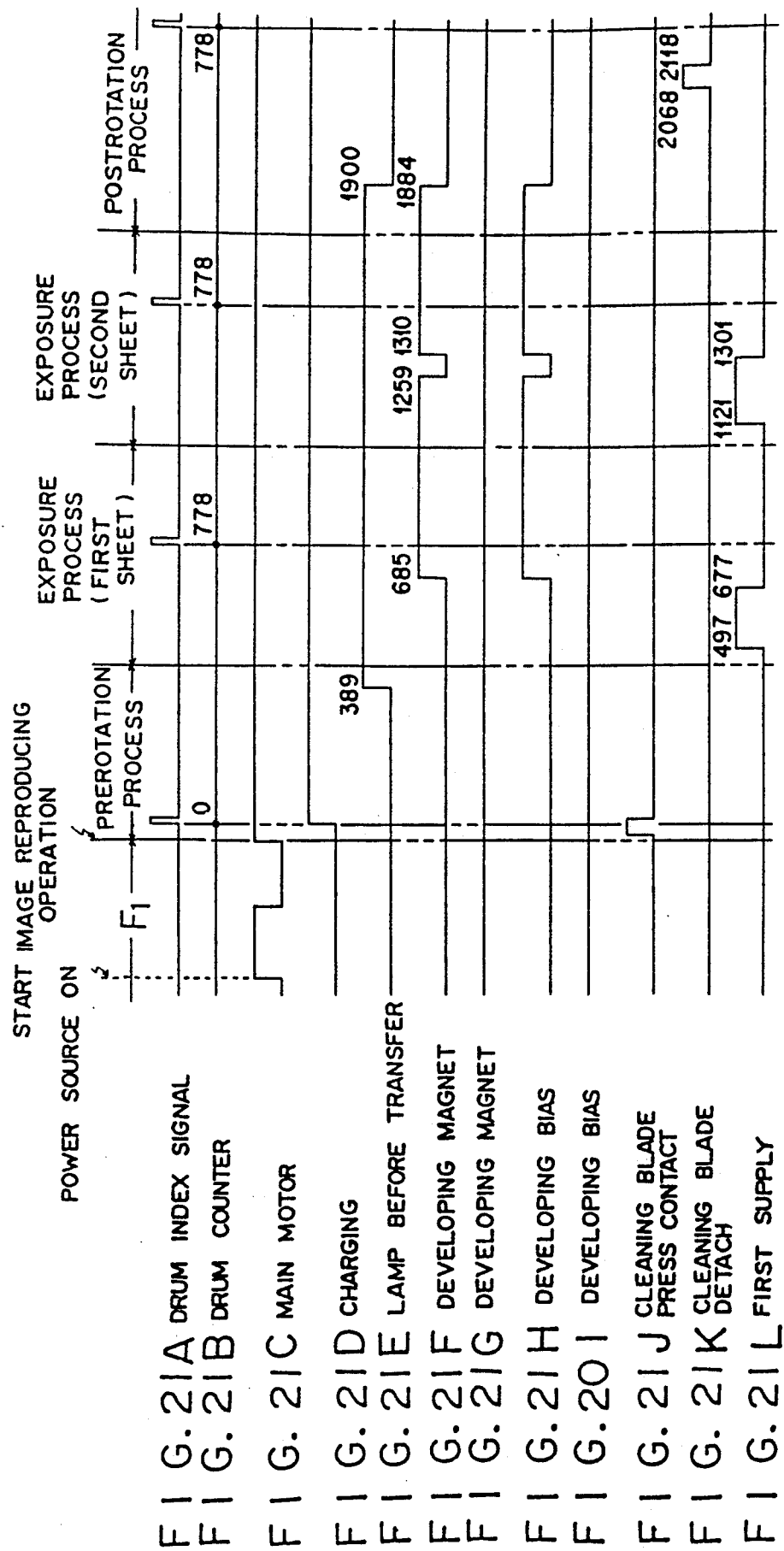

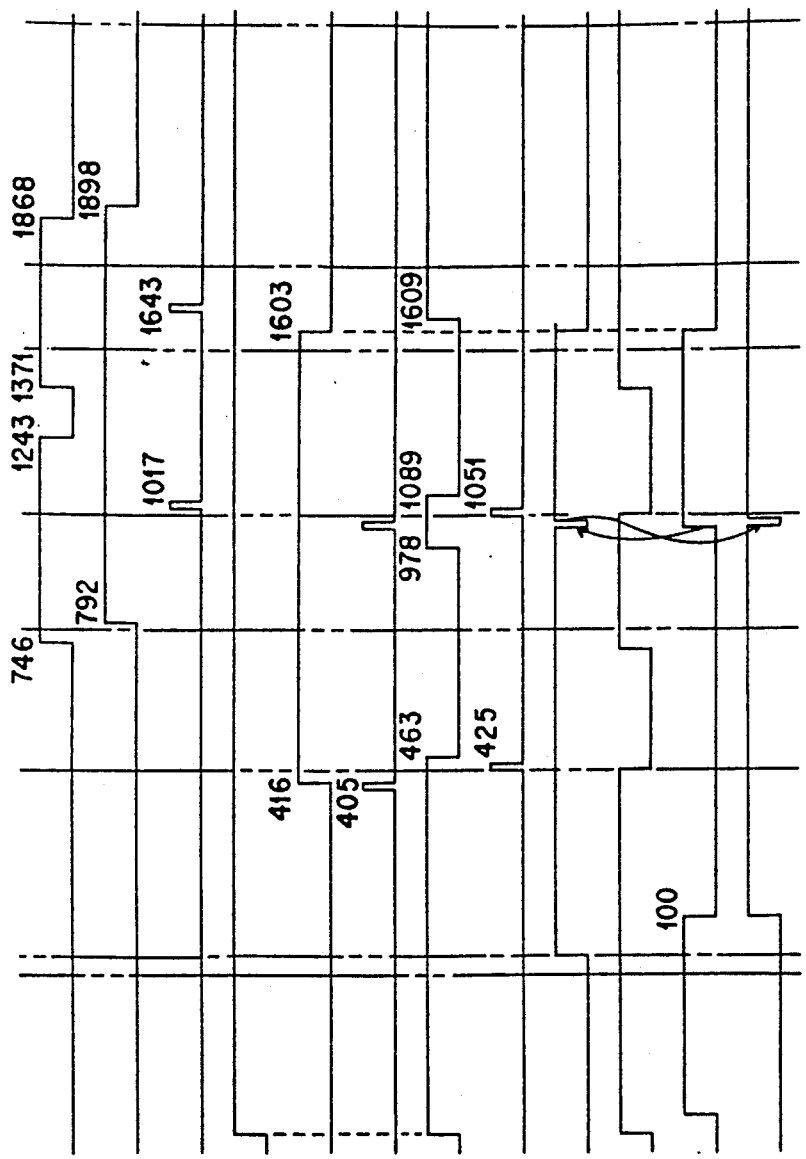

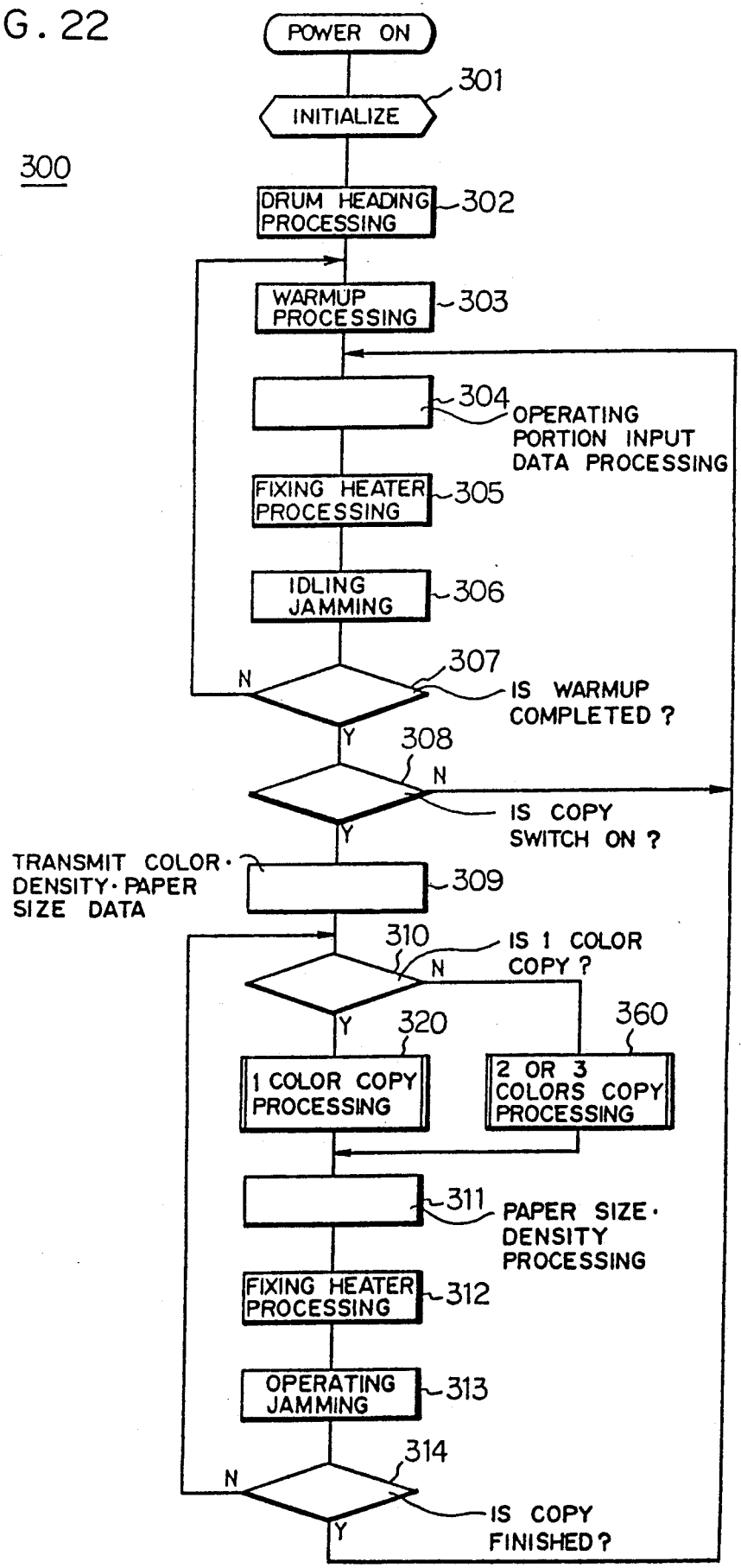

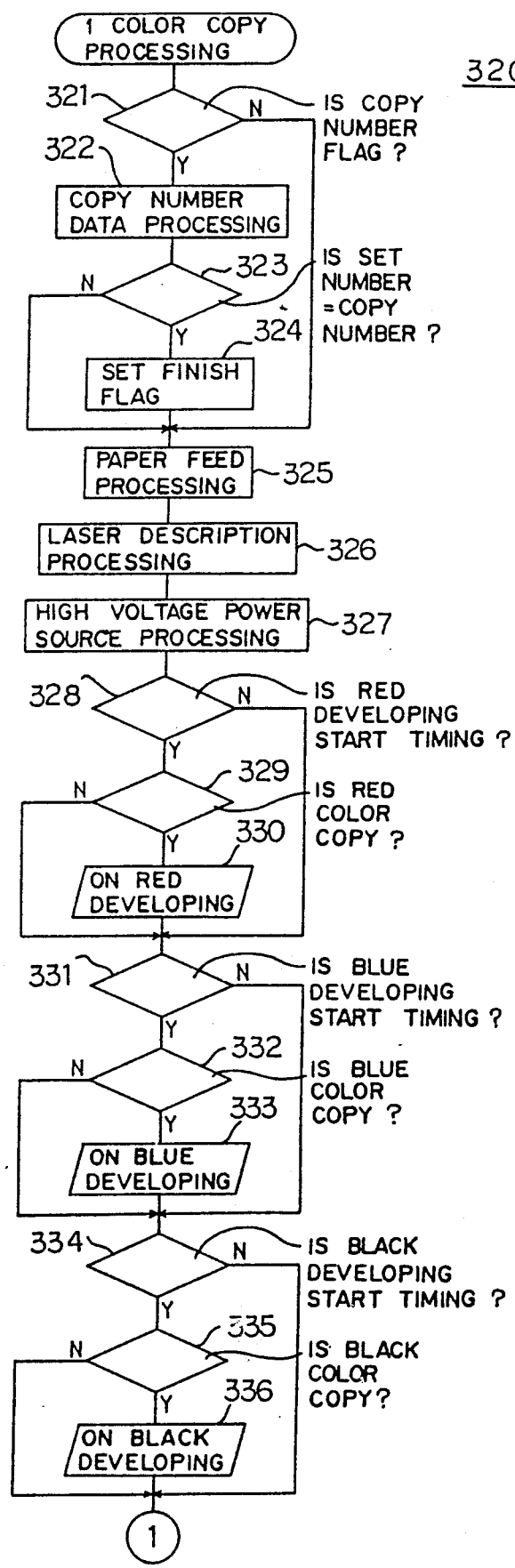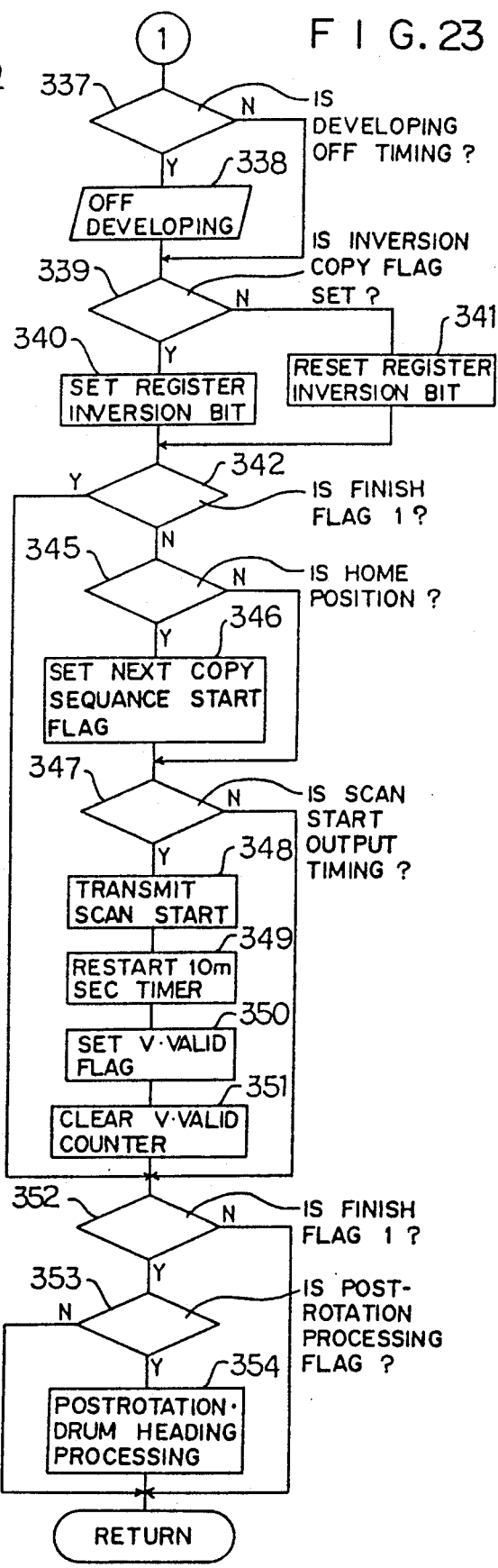
FIG. 23

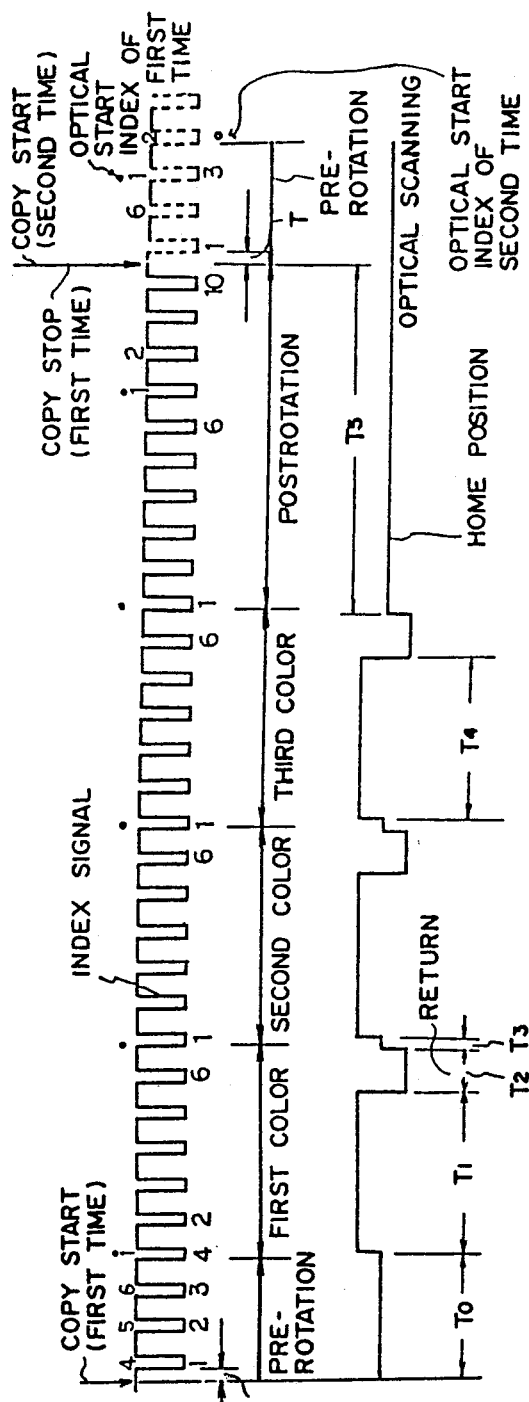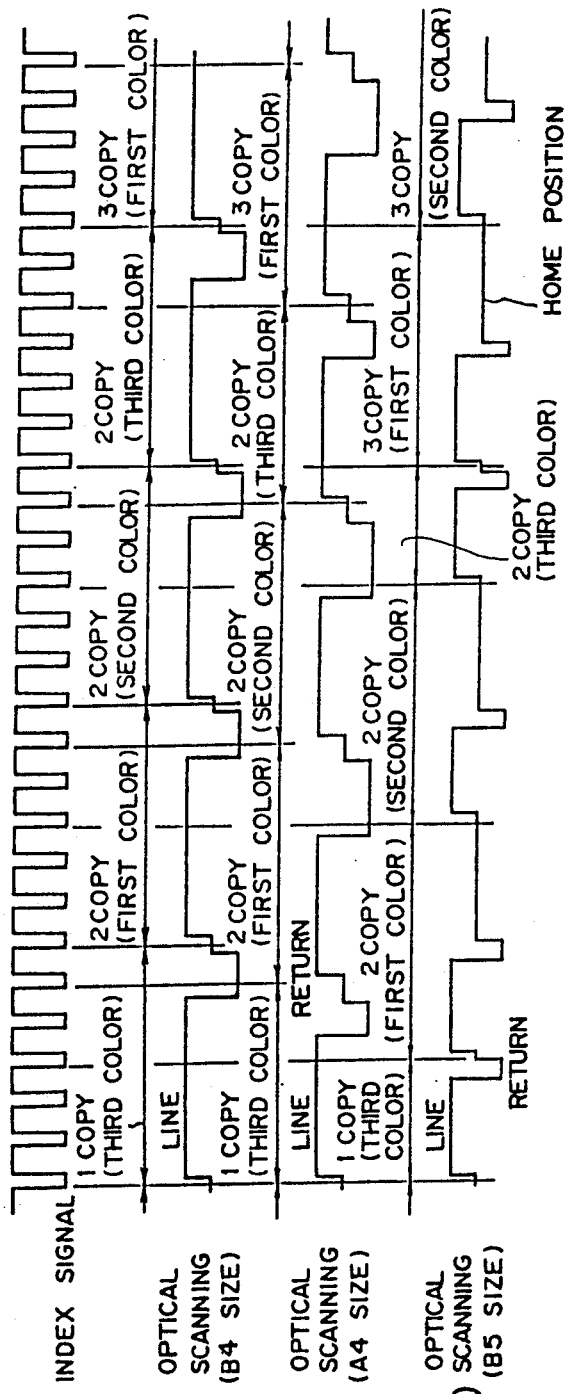

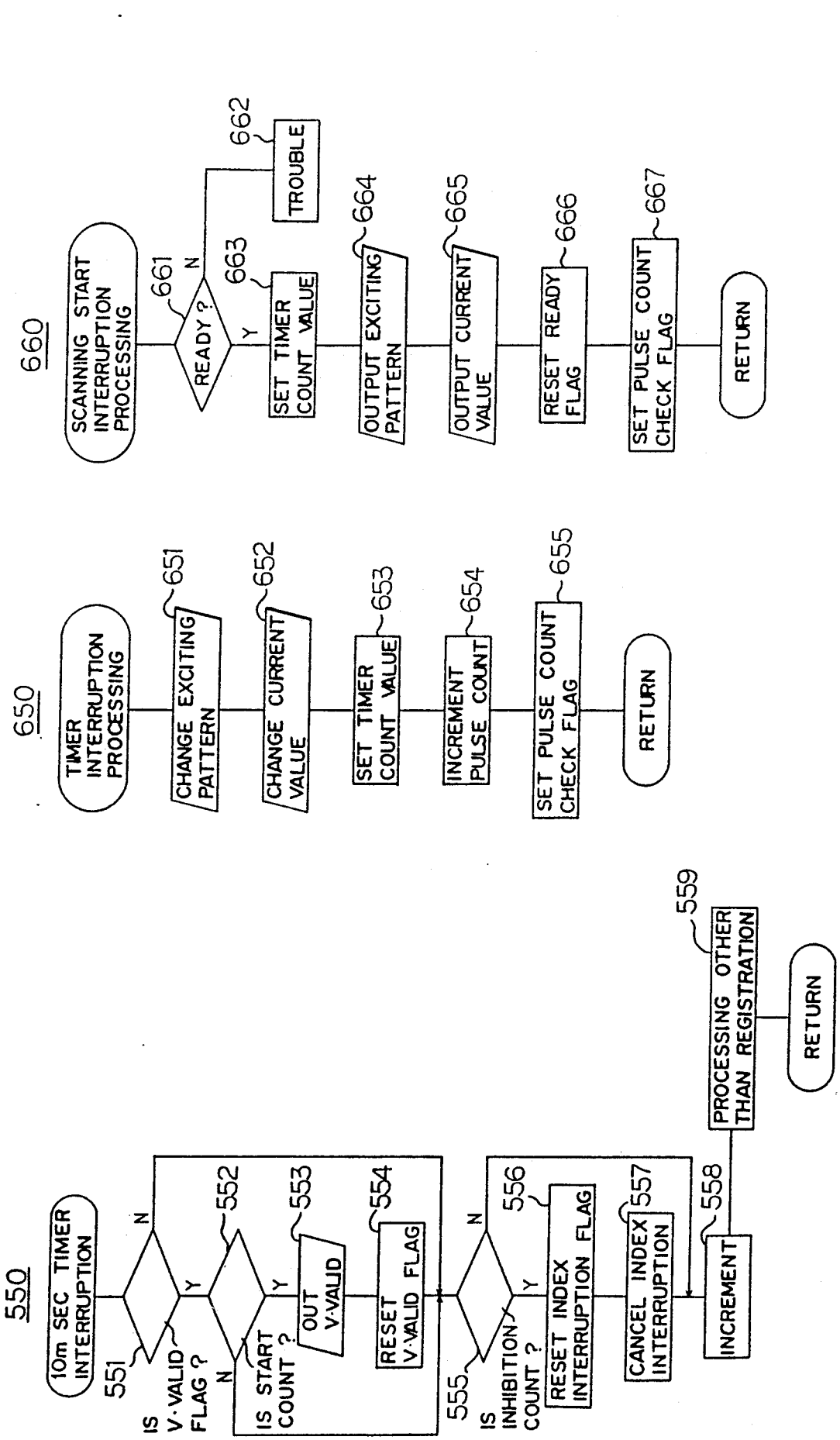

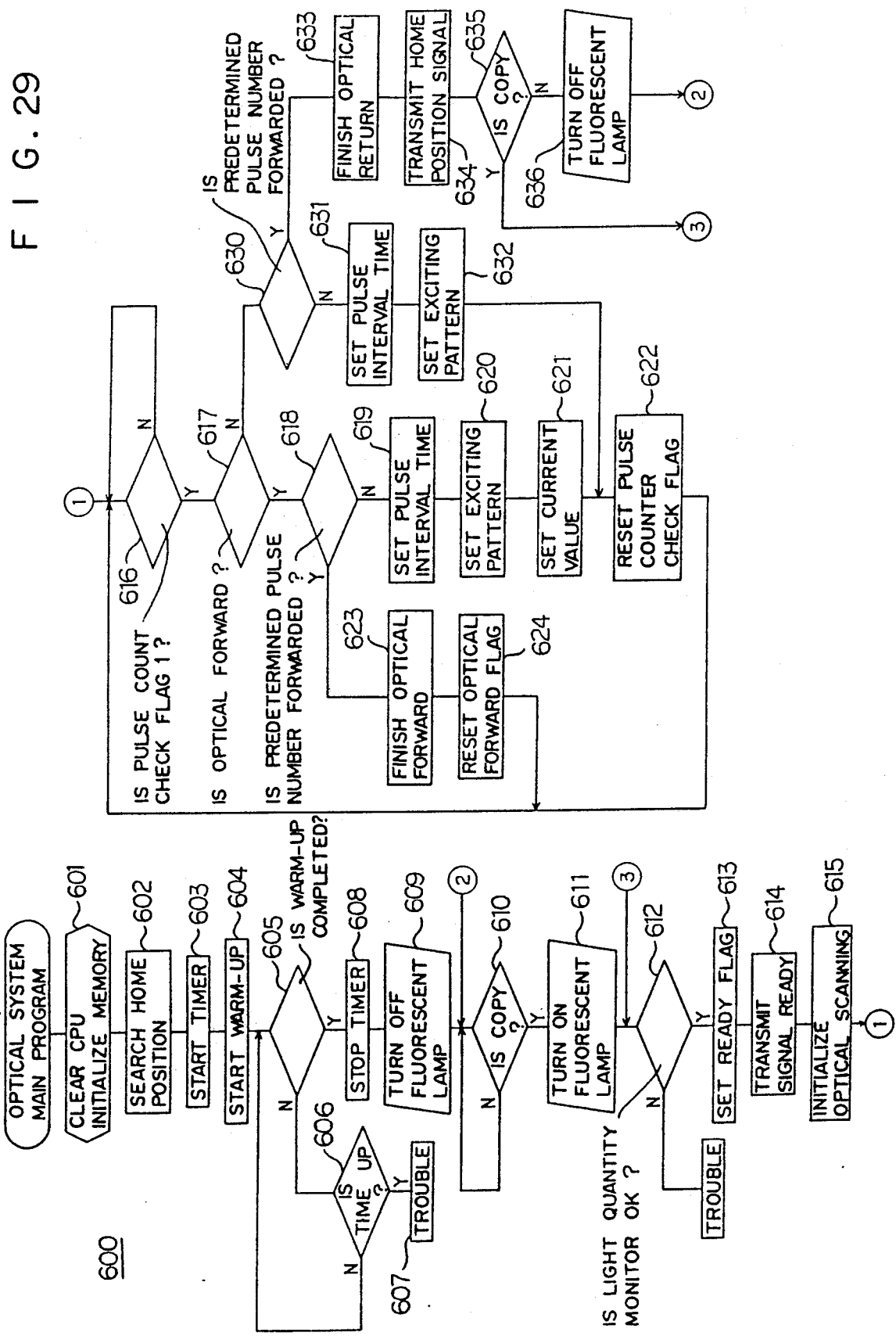

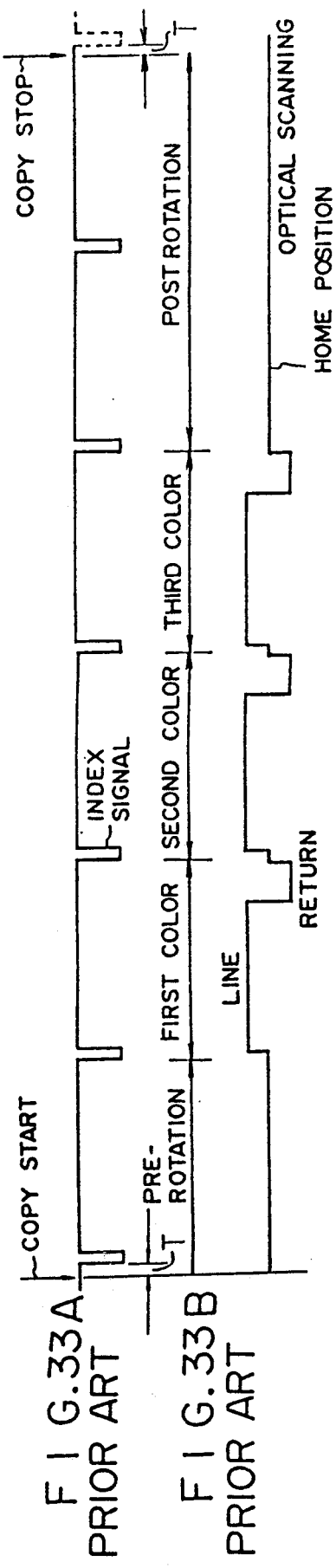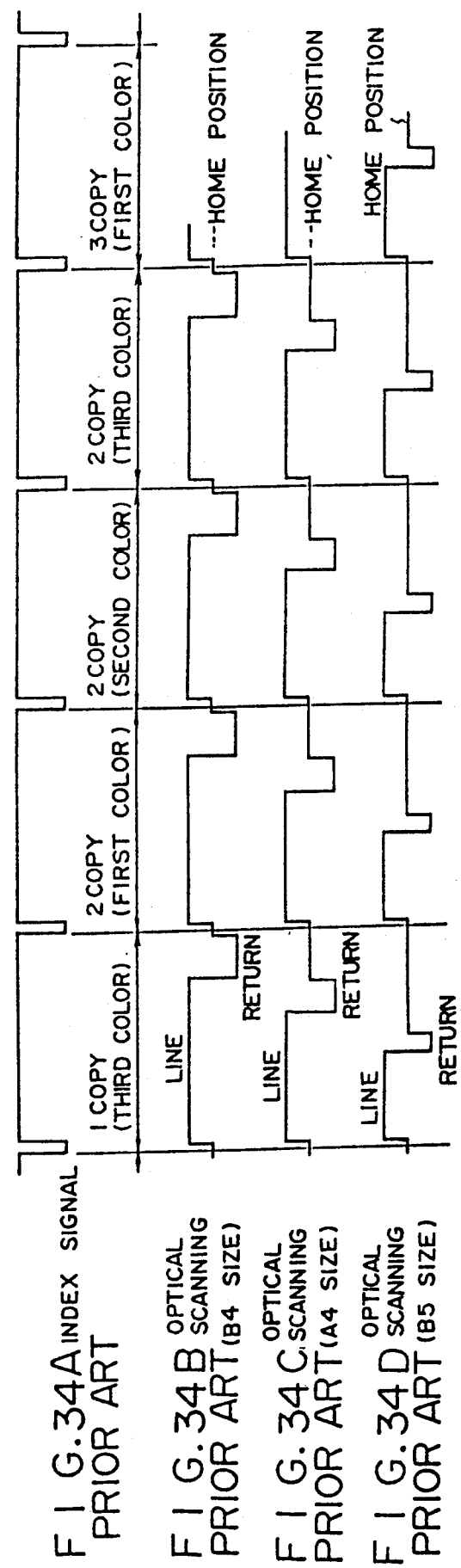

COLOR IMAGE FORMING APPARATUS FOR SUPERPOSING A PLURALITY OF IMAGES

This application is a continuation of application Ser. No. 121,528 filed Nov. 17, 1987, now abandoned.

BACKGROUND OF THE INVENTION

1. Field of the Invention:

The present invention relates to a color image forming apparatus suitably applicable to a simplified electrophotographic color image reproducing machine which reproduces a desired color image through a plurality of cycles of an exposure process.

2. Description of the Prior Art:

A color image forming apparatus applied to an electrophotographic image reproducing machine reproduces and copies the color image of a document through a sequential steps of separating the color image into a plurality of separate color images, individually writing color image signals respectively representing the separate color images in an image retainer, and developing and transferring each separate color image, or transferring and fixing all the separate color images after developing all the separate color images.

Such a color image forming apparatus, therefore, the image retainer must be rotated one turn for each of a plurality of separate color image signals to reproduce a color image and the succeeding latent images and the previously developed latent images must be registered. If the write starting position of the succeeding latent image is dislocated from that of the preceding developed latent image, the separate color images are not superposed exactly to deteriorate the print quality. Accordingly, the registration of the separate color images is very important.

Exact registration can be secured by synchronizing the operation of the optical scanning system with the rotation of the image retainer or the transfer drum by using a drum index element as a registration element. In such a case, the optical scanning system is started with reference to drum index signals provided by the drum index element and the subsequent image processing cycles are executed in timed relation with the start of the optical scanning system.

Such a prior art is disclosed in, for example, Japanese Patent Laid-Open Nos. 61-189066 and 61-51178.

Japanese Patent Laid-Open No. 61-189066 discloses a color image reproducing apparatus which reproduces a color image by superposing a plurality of color toner images on an image retainer and by transferring the superposed color toner images to a transfer paper in a single image transfer cycle. In this color image reproducing apparatus, a drum index element is associated with the image retainer to operate the optical scanning system in synchronism with the rotation of the image retainer.

Japanese Patent Laid-Open No. 61-51178 discloses a color image reproducing apparatus which reproduces a color image by forming color toner image individually on the image retainer, by transferring the color toner images individually to a transfer drum to superpose the color toner images on the transfer drum and by transferring the superposed color toner images to a transfer paper. In this color image reproducing apparatus, a drum index element is associated with the transfer drum to operate the optical scanning system in synchronism with the rotation of the transfer drum.

In either known color image reproducing apparatus, a single drum index element is provided and the drum index element provides a drum index signal once every rotation of the associated drum.

FIG. 33 shows the relation between copy start timing and drum index signals in controlling image write operation on the basis of drum index signals, particularly, in copying a color image. Prerotation process, exposure processes respectively for a first color, a second color and a third color, and postrotation process each is executed for every drum index signal.

As obvious from FIG. 33, the postrotation process is ended immediately before, namely, by a fixed time T before, the drum index signal is provided. When the copy start button is operated, the same image copying cycle is repeated.

Accordingly, the color image write operation is started always at a fixed position on the drum. When the color image write operation is started always at a fixed position on the drum, the photosensitive material coating the drum at the fixed position is deteriorated remarkably reducing the life of the same.

Furthermore, when only a single drum index element is provided, the prerotation of the drum is started upon the detection of a first drum index signal, and the start of copying operation for the first color must inevitably wait until the detection of the next drum index signal which is effected after the drum has rotated one full turn, even when ⅔ to ½ turn of the drum is sufficient for the prerotation process.

Similarly, the postrotation process requires a little less than a time corresponding to two turns of the drum despite a time corresponding to one and a half turns of the drum is sufficient for the postrotation process, as far as the copying operation is controlled on the basis of the drum index signals which are provided once every one turn of the drum.

Such a necessity of an excessive time for the prerotation process and the postrotation process impedes the reduction of the copying cycle time.

In producing a plurality of copies in such a mode of copying operation, the number of copies produced in a unit time is fixed regardless of the size of copying sheets. That is, as obvious form FIGS. 34A to 34D, the optical scanning time varies with the size of copying sheets, whereas a time required for producing a copy of size B4 is the same as that for producing a copy of size B5, because only one drum index signal is provided every one turn of the drum as shown in FIG. 34 and hence the position of an electrostatic latent image cannot be changed according to the size of the copying sheet. Obviously, it is advantageous to reduce the copying cycle time for producing copies of size B5 as compared with the copying cycle time for producing copies of size B4 so that the number of copies produced in a unit time is increased.

SUMMARY OF THE INVENTION

An object of the present invention is to provide a color image forming apparatus, wherein an image retainer is prevented from being fatigued, so that the life of the image retainer can be prolonged and a copying cycle time can be shortened.

The above object can be attained by a color image forming apparatus for forming a color image by rotating plural times an image retainer and repeating at least a latent image formation and a development comprising means for generating reference signals corresponding to a plurality of predetermined positions on said image retainer, and means for controlling the timing of an image forming sequence by using one of said reference signals corresponding to one of said positions.

According to the present invention, an image reading means such as a CCD reads and converts a color image information into a color image signal, and then a color image signal generating means extracts a plurality of color image signals, for example, a red image signal, a blue image signal and a black image signal, from the color image signal to form electrostatic latent images by the color image signals. The electrostatic latent image write timing, namely, the color image signal write timing, is determined on the basis of a drum index signal provided by a drum index element associated with the drum.

When a plurality of drum index signals are provided every one turn of the drum, the prerotation process can be accomplished while three to four drum index signals are provided, and the postrotation process can be accomplished while about ten drum index signals are provided. When the prerotation process time and the postrotation process time are thus differentiated from each other, the copy start position on the circumference of the drum is changed sequentially, so that the copy start position moves uniformly over the entire circumference of the drum and hence the deterioration of the image retainer at a specific position on the drum is prevented and thereby the life of the image retainer is extended.

Furthermore, since a plurality of drum index signals are provided every one turn of the drum, an optimum least prerotation process time and an optimum least postrotation process time can be determined selectively, and the copying process time can be regulated according to the size of the copying sheet to reduce the copying process time.

The number of drum index signals to be provided in one turn of the drum need not be limited to six, the number may be in the range of two to one hundred. Although the greater the number of drum index signals, the easier is the change of copy start position on the drum and the less the fatigue of the image retainer will be, it is difficult to machine mechanical parts associated with the generation of the drum index signal at a satisfactory accuracy. When sufficiently many drum index signals are provided in one turn of the drum, the copying operation can be stopped at an optional position of the drum and, since the drum index signals are provided at very short intervals, the next copying operation can be started without delay.

The above and other objects, features and advantages of the present invention will become apparent from the following description taken in conjunction with the accompanying drawings.

BRIEF DESCRIPTION OF THE DRAWINGS

FIGS. 6A to 6G are time charts of assistance in explaining the image reading device;

FIG. 7 is a perspective view of assistance in explaining an image reading system;

FIG. 10 is an exemplary color extraction map;

FIGS. 12A to 12I and 13A to 13I are time charts showing the relation between color image signals and color image signal recording operation;

FIGS. 19A to 19DD, 20A to 20DD and 21A to 21X are time charts of assistance in explaining a color image processing operation;

FIGS. 22 to 26, 28, 29, 30 and 31 are flow charts of control programs to be executed by the first and second microcomputers;

FIGS. 27A and 27B are time charts of assistance in explaining the control program of FIG. 26;

FIGS. 32A to 32D are time charts of assistance in explaining a copying operation in a continuous copy mode; and FIGS. 33A and 33B and 34A to 34D are time charts of assistance in explaining the operation of a color image processing apparatus of the present invention

DESCRIPTION OF THE PREFERRED EMBODIMENTS

Figure 1:
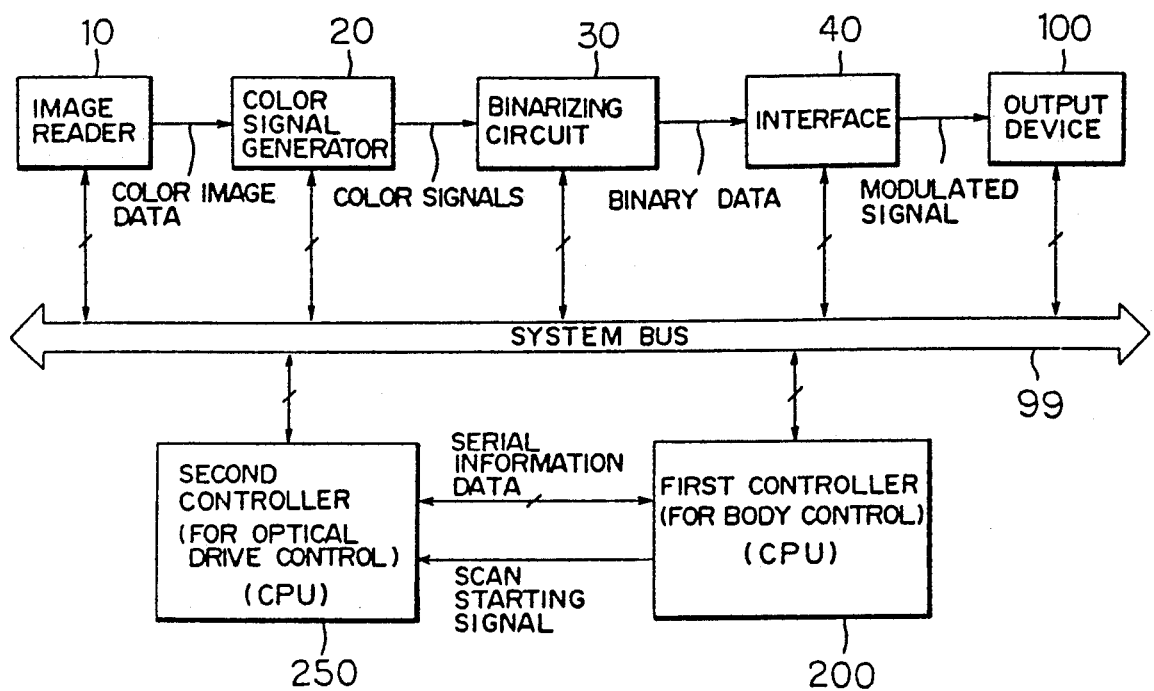
FIG. 1 is a block diagram of assistance in explaining the general constitution of a color image forming apparatus, in a preferred embodiment, according to the present invention.

FIG. 1 shows the general constitution of a color image forming apparatus in accordance with the present invention.

First, a color image reproducing machine usable in the present invention will be described.

Figure 2:
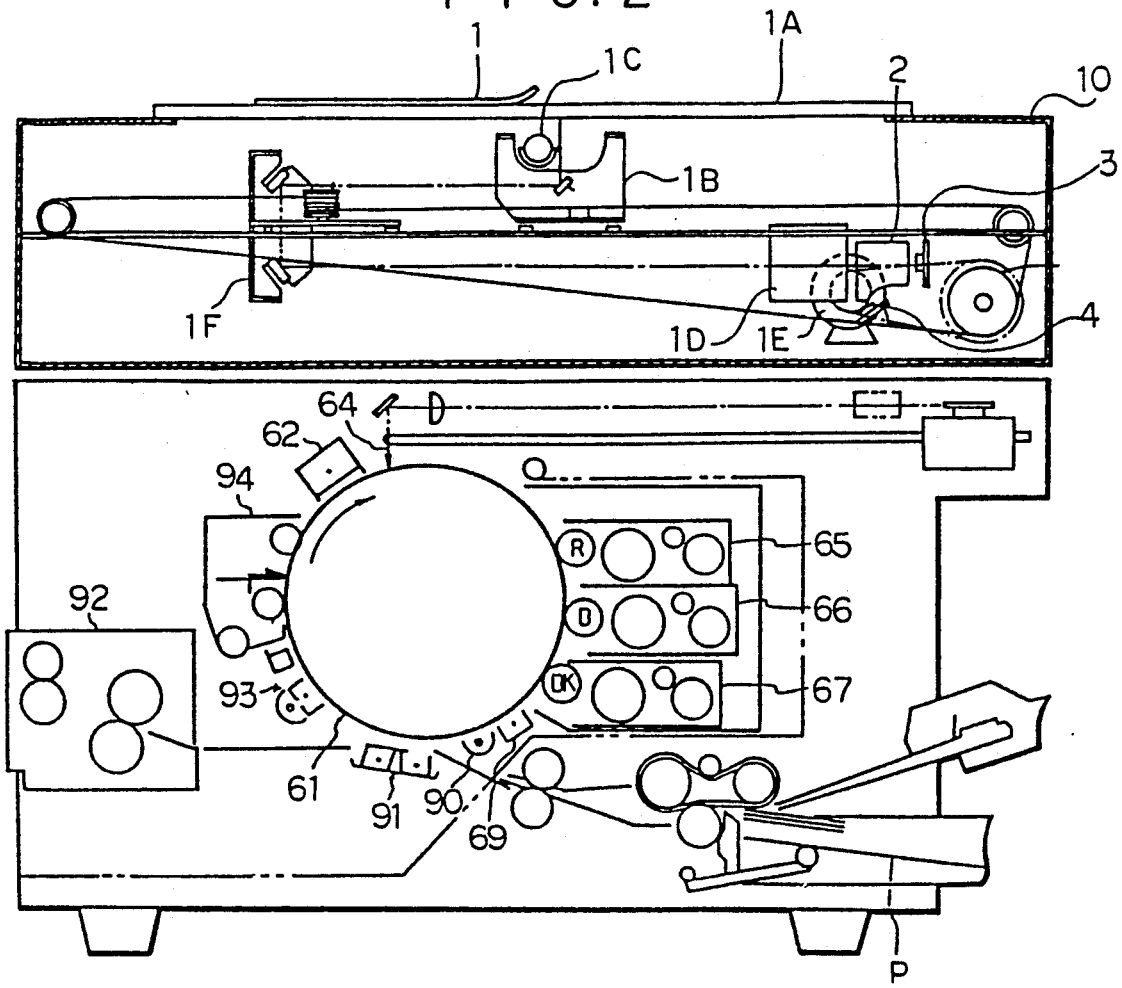
FIG. 2 is a schematic sectional view showing the essential portion of a color image reproducing machine capable of incorporating the present invention.

Referring to FIG. 2, there are shown a platen glass 1A for supporting a document 1, a reciprocating carriage 1B disposed for reciprocation below the platen glass 1A, a linear halogen lamp 1C for illuminating the document 1, mounted on the carriage 1B so as to extend perpendicularly to the sheet in FIG. 2, a movable mirror unit 1F including two mirrors disposed so as to make an angle of 90° therebetween, a stepping motor 1E for driving the optical scanning system, a lens 1D through which light reflected by the document 1 and mirrors travels, a dichroic prism 2, a red channel (hereinafter referred to as "R-ch") CCD 3 having a light receiving surface on which a R-ch image separated by the dichroic prism 2 is focused, and a cyan channel (hereinafter referred to as "C-ch") CCD 4 having a light receiving surface on which a C-ch image separated by the dichroic prism 2 is focused. The R-ch CCD 3 and the C-ch CCD 4 are line image sensors each having a plurality of sensing elements arranged along the main scanning direction, which, in FIG. 2, is perpendicular to the sheet.

Referring to FIG. 1, an image reading device 10 converts a color image information carried by the document into a color image signal, and then converts the color image signal into image data of predetermined bits, for example image data of sixteen gradations (O to F), through image processing operation including A/D conversion. A color image signal generating device 20 extracts a plurality of color image signals from the image data. The plurality of color image signals in this embodiment are supposed to be a red image signal, a blue image signal and a black image signal. However, the color image signals may be those other than the red image signal, the blue image signal and the black image signal. A binarizing circuit 30 binarizes the extracted color image signals sequentially to provide binary dithers by using, for example, a dither matrix having a predetermined threshold value. The dither images are given through an interface circuit 40 to an output device 100. The interface circuit 40 controls the output level of the dither images and generates a test pattern. The output device 100 is a laser recording device or the like. When a laser recording device is employed, the dither images are converted into corresponding light signals and the light signals are modulated on the basis of the binary data of the dither images. Accordingly, in this embodiment, the mode of signal modulation is an internal modulation mode, however, the mode may be an external modulation mode.

Electrostatic latent color images are formed by the light signals generated by the output device 100, and the electrostatic latent color images are developed individually, and then the developed color images are subjected to a fixing process to record a color image on a recording sheet.

The operation of the image reading device 10, the color image signal generating device 20, the binarizing circuit 30, the interface device 40 and the output device 100 is controlled on the basis of a predetermined algorithm by a first controller 200 and a second controller 250. The controllers 200 and 250 comprises microcomputers. The first controller 200 controls the image processing apparatus while the second controller 250 controls mainly peripheral equipments for image reading. The controllers 200 and 250 communicates through a system bus 99 with the devices 10, 20, 30, 40 and 100.

In addition to providing command signals, the first controller 200 and the second controller 250 control hardwares for image reading and color reproducing apparatus associated with the output device 100 according to a predetermined sequence.

A concrete embodiment of this color image processing apparatus will be described hereinafter.

First, a simplified color image reproducing machine to which the present invention is suitably applicable will be described with reference to FIG. 2 and the associated drawings.

The simplified color image reproducing machine is intended to record a color image by separating color image information into a plurality of color image data, for example, three color image data. In this embodiment, the color image data are a red image data (hereinafter referred to as "R image data"), a blue image data (hereinafter referred to as "B image data") and a black image data (hereinafter referred to as "BK image data") by way of example.

Referring to FIG. 2, a color image reproducing machine 60 has a drum-shaped image retainer 61 having a circumference coated with a photoconductive photosensitive layer, such as a layer of an organic photoconductive material (OPC), capable of forming an electrostatic latent image when exposed to a light image.

A charging device 62, a developing device 65 containing a red toner, a developing device 66 containing a blue toner, a developing device 67 containing a black toner, a charging device before transfer 69, a lamp before transfer 90 an a transfer device 91 are arranged around the image retainer 61 in that order along the direction of rotation of the image retainer 61.

The charging device 62 charges the circumference of the image retainer 61 uniformly, and then the charged circumference of the image retainer 61 is exposed to separate color light images 64 to form electrostatic latent color images on the circumference of the image retainer 61.

The developing devices 65, 66 and 67 are brought selectively and sequentially into operation in synchronism with the rotation of the image retainer 61 to develop the corresponding electrostatic latent color images. When the developing device 67 is selected, the black toner is applied to the electrostatic latent black image to develop the same.

The charging device before transfer 69 and the lamp before transfer 90 facilitate the transference the developed color images to a copying sheet P and also facilitate the separation of the copying sheet P from the image retainer 61. The charging device before transfer 69 and the lamp before transfer 90 are provided if necessary.

The transfer device 91 transfers the color toner image developed on the image retainer to a copying sheet P, then a fixing device 92 fixes the color toner images to the copying sheet P, and then the copying sheet P is discharged.

A charge eliminating device 93 is a combination of a charge eliminating lamp and a charge eliminating corona discharging device or either a charge eliminating lamp or a charge eliminating corona discharging device.

A cleaning device 94 comprises a cleaning blade, a magnetic brush or a fur brush. The cleaning device 94 removes residual toner adhering to the circumference of the image retainer 61 after the toner images have been transferred to the copying sheet P. As well known, the cleaning device 94 is retracted from the circumference of the image retainer 61 before an area of the circumference of the image retainer 61 carrying a toner image arrives at the cleaning position.

The charging device 62 is, for example, a scorotron corona discharger. The scorotron corona discharger is less affected by electric charge given to the image retainer 61 in the preceding charging cycle, and is capable of stably charging the image retainer 61 at a fixed surface potential.

Figure 3:
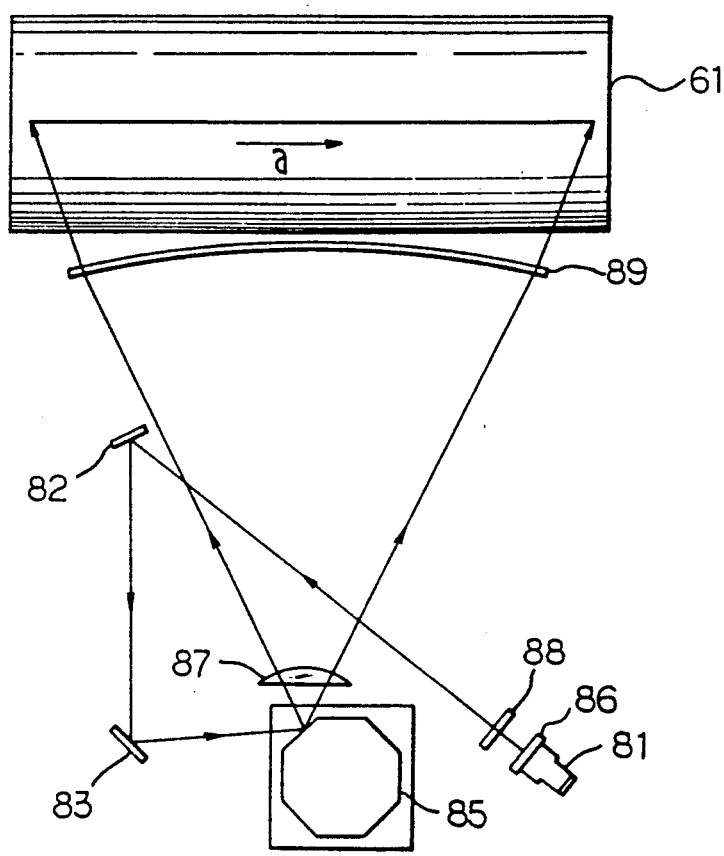
FIG. 3 is a diagrammatic illustration showing the constitution of an optical scanning device.

A laser beam scanner 80 as illustrated in FIG. 3 is employed as an optical scanning device for producing the color light images 64. The laser beam scanner 80 enables copying a color image in clear print, which will be described afterward. The laser beam scanner 80 has a laser 81, such as a semiconductor laser, which is controlled in an on-off control mode on the basis of the separate color images represented, for example, by binary data. A laser beam emitted by the laser 81 is reflected by mirrors 82 and 83 and falls on a polygonal scanning mirror 85 (an octagonal rotating mirror having eight facets, in this embodiment). The laser beam is deflected by the scanning mirror 85, travels through a focusing f-θ lens 87 and falls on the circumference of the image retainer 61. Indicated at 88 and 89 are cylindrical lenses for correcting tilt angle. The laser beam is moved at a fixed speed in a predetermined direction a along the circumference of the image retainer 61 by the scanning mirror 85 to expose the circumference of the image retainer 61 to separate color light images. A collimator lens 86 is provided to collimate the laser bean so that the laser beam on the circumference of the image retainer 61 is a spot having a predetermined diameter. A galvanomirror or an optical quartz deflector may be employed as the scanning mirror instead of the polygonal rotating mirror.

The developing devices 65, 66 and 67 are substantially the same in constitution, and hence only the developing device 65 will be described herein.

Figure 4:
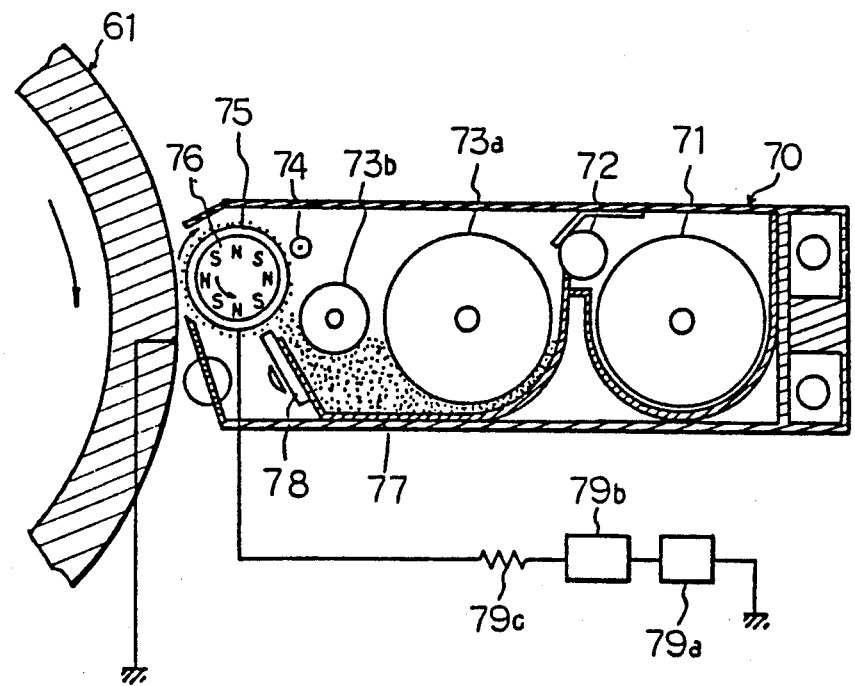
FIG. 4 is a schematic sectional view of a developing device.

Referring to FIG. 4, the developing device 65 comprises a housing 70, a toner replenishing unit 71, a sponge roller 72, toner stirring members 73a and 73b, a scraper 74, a developing sleeve 75, a magnet roller 76, and a doctor blade 78. Also shown in FIG. 4 are a resistor 79c, an AC power source 79b and a DC power source 79a.

The toner supplied by the toner replenishing unit 71 is supplied to the developing unit comprising the developing sleeve 75 and the magnet toller 76 by the action of the sponge roller 72 and the stirring members 73a and 73b. A layer of a developer 77 containing the toner and carrier is formed over the circumference of the developing sleeve 75. The thickness of the layer of the developer 77 is regulated at a fixed value by the doctor blade 78. The toner is transferred from the developing sleeve 75 to the circumference of the image retainer 61 to develop the electrostatic latent color image formed over the circumference of the image retainer 61. After the toner has been transferred to the image retainer 61, the developer remaining over the circumference of the developing sleeve 75 is scraped off by the scraper 74. In FIG. 4, a clockwise arrow indicates the direction of movement of the developer and a counterclockwise arrow indicates the direction of rotation of the magnet roller 76.

An AC signal of a predetermined level superposed on a DC signal is applied through the resistor 79c to the developing sleeve 75 to give a predetermined developing bias to the developing sleeve 75 relative to the image retainer 61.

The developing cycle is repeated to superpose separate color toner images. Accordingly, it is preferable that at least the second and the following developing cycles are carried out in a noncontact jumping developing mode to obviate blurring the toner image formed on the image retainer 61 in the preceding developing cycle during the succeeding developing cycle. The developing device 65 shown in FIG. 4 is of a type which operates in the noncontact jumping developing mode. Preferably, the developer is a two-component developer consisting of a nonmagnetic toner and a magnetic carrier. Such a two-component developer is able to develop a latent color image in a clear color and facilitates charging the toner.

The components of the color image processing apparatus shown in FIG. 1 will be described in detail hereinafter with reference to FIG. 5.

Figure 5A:
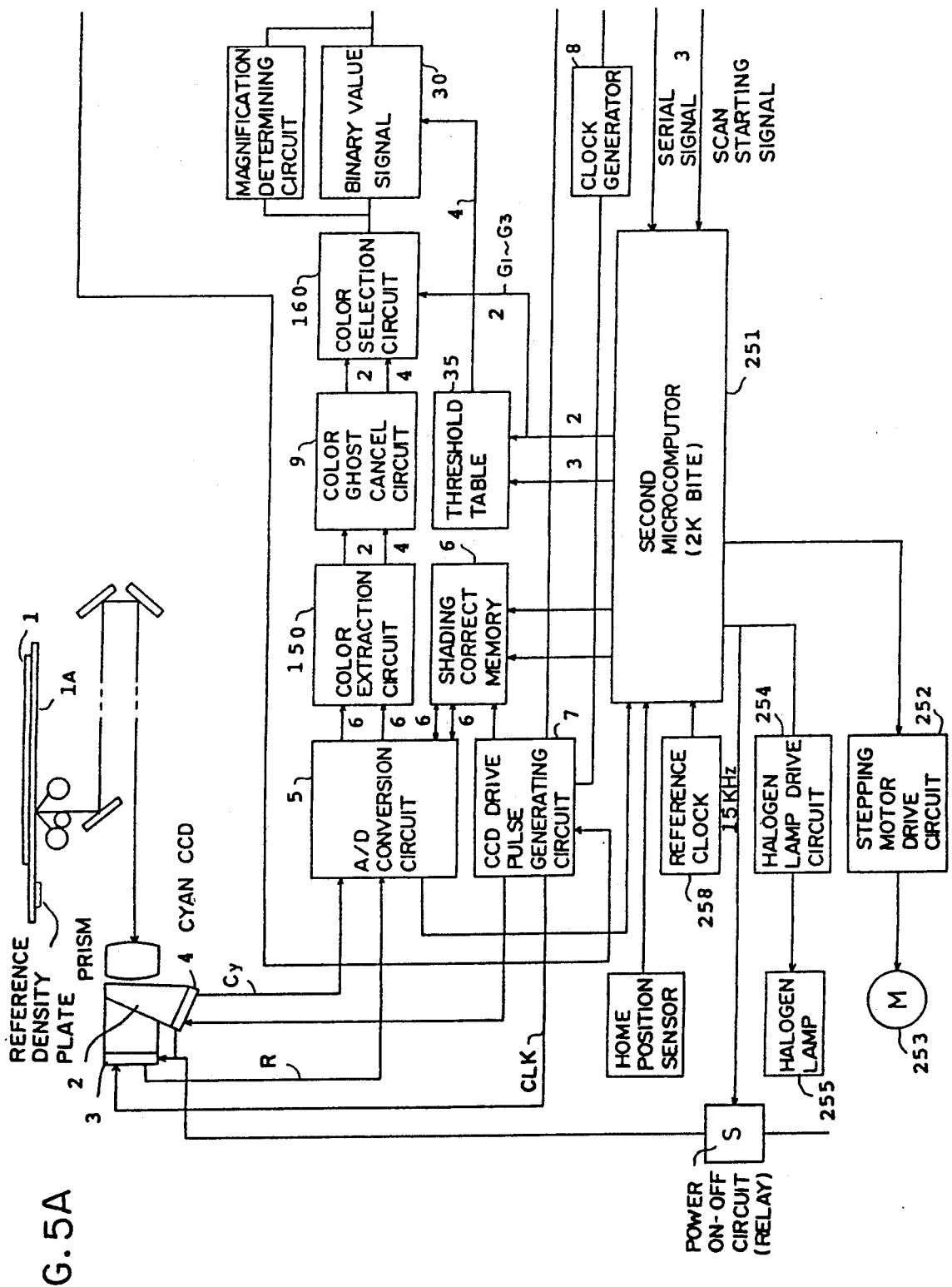
FIGS. 5A and 5B are block diagrams of an image reading device.
Figure 5B:
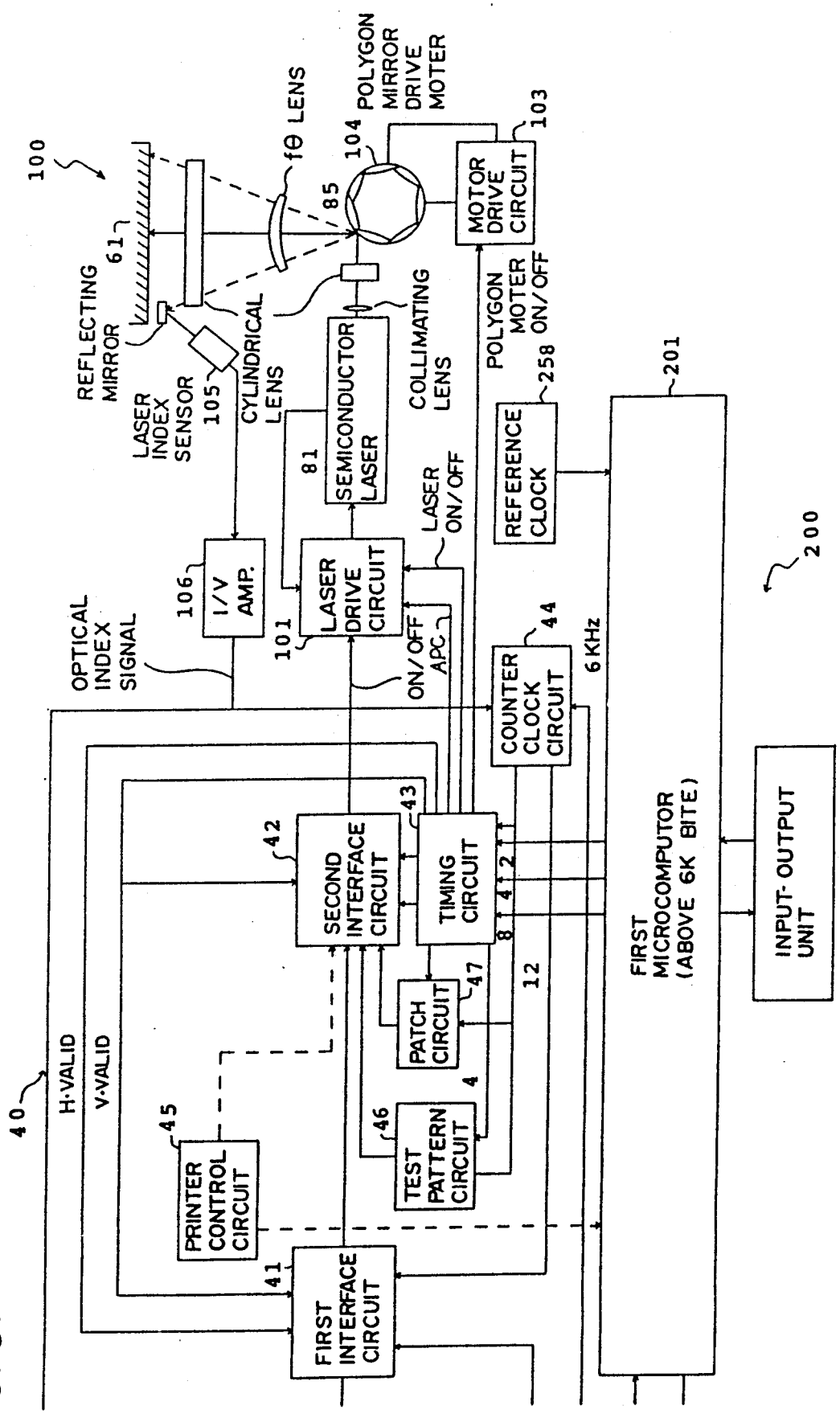

Referring to FIG. 5, The color light image information of the document 1 placed on the platen glass 1A is separated into two separate color images, namely, an image R and an image Cy in this embodiment, by the dichroic mirror 2. Accordingly, the cut-off wavelength of the dichroic mirror 2 is on the order of 600 nm, so that the red component is transmitted and the cyan component is reflected. The image R and the image Cy are given to the R-ch CCD 3 and the C-ch CCD 4, respectively, and then the R-ch CCD 3 and the C-ch CCD 4 provide only a R-ch image signal and a C-ch image signal, respectively.

FIGS. 6A to 6G show timing signals necessary for providing the image signal R and the image signal Cy. The interval between the trailing edge of a preceding pulse and the leading edge of a succeeding pulse of a horizontal valid range signal H-VALID (FIG. 6 C) corresponds to the maximum read width W of the CCDs 3 and 4. The image signal R (FIG. 6F) and the image signal Cy (FIG. 6 G) are read in synchronism with a synchronizing clock signal CLK (FIG. 6 E). The image signal R and the image signal Cy are given through a normalizing amplifier, not shown, to an A/D converter 5. The A/D converter 5 converts the image signals R and Cy into digital signals having predetermined bits. The A/D conversion includes shading correction. A shading correcting memory 6 extracts and stores a line of white image data obtained by scanning a reference density plate placed outside the image reading range and uses the white image data for shading correction. The data stored in the memory 6 is read in synchronism with clock CLK generated by a CCD driving pulse generating circuit 7. The CCD driving pulse generating circuit 7 includes a clock generator 8. The timing for reading the data from the memory 6 is regulated by a drum index signal given to the pulse generating circuit 7 for starting scanning operation and a control signal provided by the second controller 250.

A color extracting circuit 150 extracts a plurality of color image signals necessary for color image reproduction from the digital color image signal. Since the present simplified color image reproducing machine reproduces a color image by three colors, namely, red, blue and black, the color extracting circuit 150 extracts a color image signal R, a color image signal B and a color image signal BK from the digital color image signal. The manner of color image signal extraction will be described afterward. The color image signals R, B and BK are given to a ghost canceling circuit 9 to cancel ghost which appears in the main scanning direction and the subscanning direction.

As shown in FIG. 7, the main scanning direction with respect to the document 1 is the direction of the lines of the CCDs 3 and 4, namely, a horizontal scanning direction, and the sub-scanning direction is the direction of movement of the CCDs 3 and 4, namely, a vertical scanning direction.

The color image signals R, B and BK thus eliminated of ghost are given to a color selecting circuit 160. The color selecting circuit 160 selects one color image signal every one turn of the image retainer 61, because one separate color image is developed every one turn of the image retainer 61. The developing devices 65, 66 and 67 are selected sequentially one at a time in synchronism with the rotation of the image retainer 61, and the color selecting circuit 160 selects the color image signals sequentially to feed a color image signal corresponding to the selected developing device.

The second controller 250 (the second microcomputer) provides selection signals G1, G2 and G3 respectively for selecting the color image signals R, B and BK. A mode of output of the selection signals G1, G2 and G3 in a three-color recording mode, namely, a normal recording mode, and a mode of output of the selection signals G1, G2 and G3 in a monochromatic image reproducing mode, namely, a specified color recording mode, are different from each other. The color extracting process for extracting three color image signals from a color document is carried out once every one turn of the image retainer 61.

The basic conception of color extraction for extracting three color image signals from tow colors will be described hereinafter.

Figure 8A:
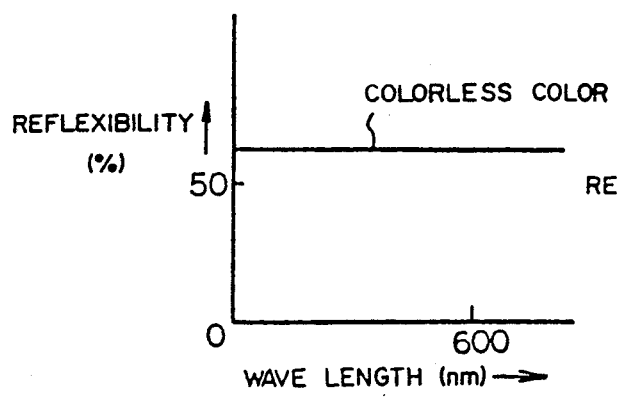
FIGS. 8A, 8B and 8C are graphs showing the variation of the respective reflexibility of color image signals with wavelength.
Figure 8B:
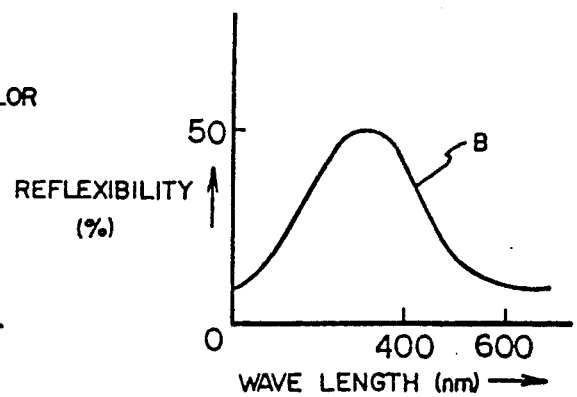
Figure 8C:
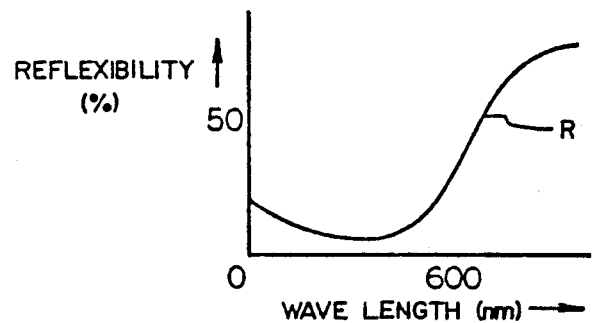

Referring to FIGS. 8A to 8C typically showing the spectral reflection characteristics of color components, FIGS. 8A, 8B and 8C show the respective spectral reflection characteristics of an achromatic color, blue and red. In these figures, wavelength (nm) is measured on the horizontal axis, and relative sensitivity (%) is measured on the vertical axis.

Red, blue and black can be extracted on the basis of a color extraction map prepared by producing a coordinate system by using the respective levels VR and VC, which are normalized on the basis of white, of the red image signal R and the cyan image signal Cy.

The following matters must be taken into consideration in determining the coordinate axes.

(1) The conception of the reflexibility (reflection density) of the document 1 corresponding to the luminance signal of TV signals to represent medium tone.

(2) The conception of color difference including difference in hue and chroma between red and cyan.

Accordingly, luminance signal information, for example, a digital signal of five bits, and color difference signal information, for example, a digital signal of five bits are expressed by $$\text{Luminance signal information} = VR + VC \quad (1)$$

$$0 \leq VR \leq 1.0 \quad (2)$$

$$0 \leq VC \leq 1.0 \quad (3)$$

$$0 \leq VR + VC \leq 2.0 \quad (4)$$

Thus, VR+VC, namely, the level of every color, is in the range of the level of black (0) to the level of white (2.0). Therefore, color difference signal information is $$VR/(VR+VC) \text{ or } VC/(VR+VC) \quad (5)$$

For achromatic colors, the respective ratios of the level VR of red and the level VC of cyan to the total level (VR+VC) are the same and hence $$VR/(VR+VC) = VC/(VR+VC) = 0.5 \quad (6)$$

For chromatic colors, the respective levels of colors in the red band and those in the cyan band are different from each other. That is, for chromatic colors in the red band, $$0.5 < VR/(VR+VC) \leq 1.0 \quad (7)$$

$$0 \leq VC/(VR+VC) < 0.5 \quad (8)$$

and for chromatic colors in the cyan band, $$0 \leq VR/(VR+VC) < 0.5 \quad (9)$$

$$0.5 < VC/(VR+VC) \leq 1.0 \quad (10)$$

Accordingly, chromatic colors, namely, colors in the red band and the cyan band, can be discriminated clearly from achromatic colors through the comparison of levels by using a coordinate system employing VR+VC and VR/(VR+VC), or VR+VC and VC/(VR+VC) as coordinate axes.

Figure 9:
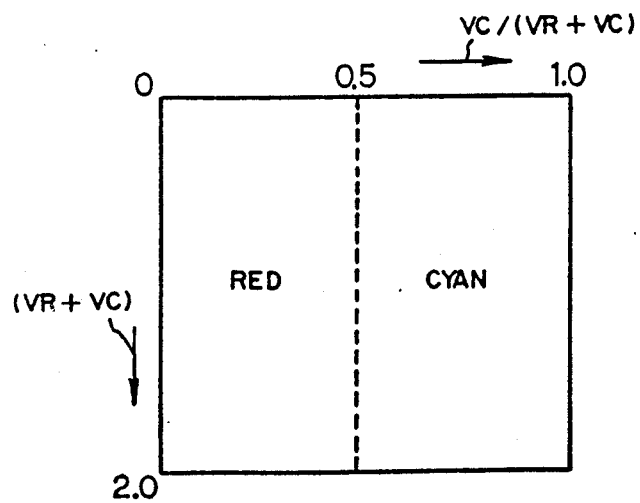
FIG. 9 is an illustration of assistance in explaining color extraction.

FIG. 9 shows a coordinate system employing the luminance signal component VR+VC as the vertical axis, and the color difference signal component VC/(VR+VC) as the horizontal axis. In this case, a range below 0.5 is for the colors of the red band, and a range above 0.5 is for the colors of the cyan band. Achromatic colors are distributed in the vicinity of color difference signal information=0.5 and in a range where less luminance signal information is available.

FIG. 10 shows a concrete color extraction map classifying colors according to such a color extraction method.

The color extraction map is formed in a ROM table. The color extraction map shown in FIG. 10 is divided into 32×32 blocks. Therefore, for this ROM table, the number of address bits for line is five and that for row is five. The ROM table stores quantized values corresponding to the reflection density of the document.

Figure 11A:
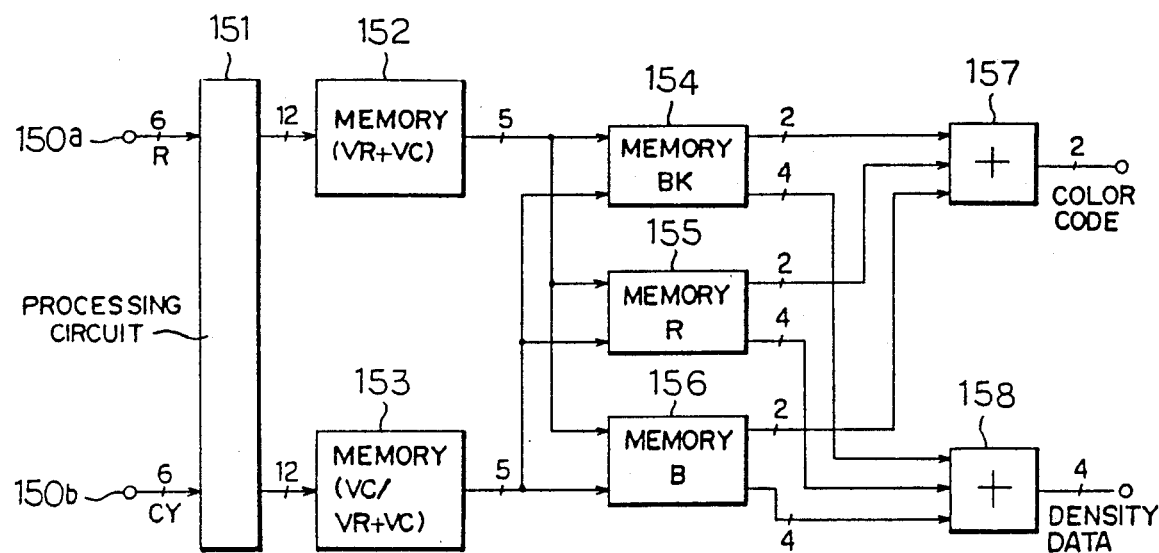
FIG. 11A is a block diagram of a color extraction circuit.
Figure 11B:
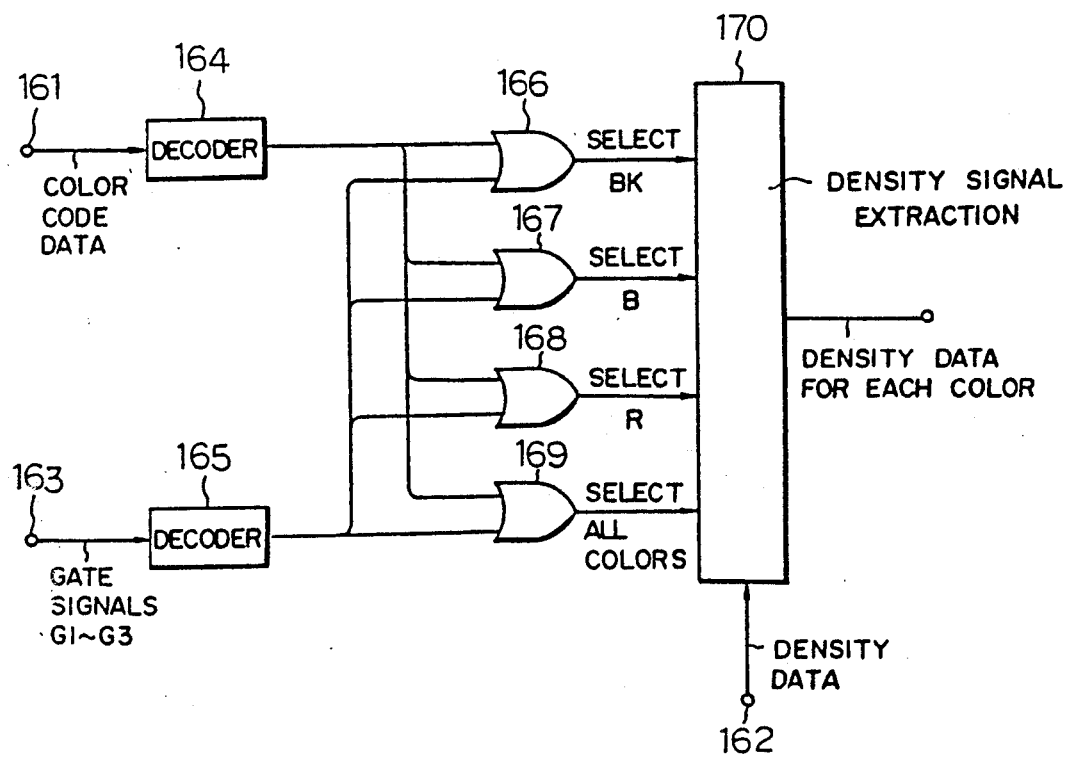
FIG. 11B is a block diagram of a color selection circuit.

FIGS. 11A and 11B show the color extraction circuit 150 and the color selecting circuit 160, respectively.

Referring to FIG. 11A, a red image signal R and a cyan image signal Cy before three-color extraction are applied to terminals 150a and 150b, respectively, of a processing circuit 151. The processing circuit 151 processes the red image signal R and the cyan image signal Cy through gradation conversion and γ correction. The data provided by the processing circuit 151 are used as an address signal for selecting data from a memory 152 storing the operated data of luminance signal VR+VC and for selecting data from a memory 153 storing the operated data of color difference signal VC/(VR+VC). The output signals of the memories 152 and 153 are used as address signals for extraction memories (ROMs) 154 for the black image signal BK, 155 for the red image signal R and 156 for the blue image signal B. The memories 154, 155 and 156 are data tables storing color extraction maps for colors, respectively, shown in FIG. 10.

As obvious from the color extraction map shown in FIG. 10, three color image signals R, B and BK can be extracted from the color information signal of a color document by detecting the respective levels of the red image signal R and the cyan image signal Cy.

The memories 154, 155 and 156 each provides density data of four bits and color code data of two bits of the corresponding color image signal simultaneously. The density data and the color code data are composed respectively by composing circuits 157 and 158. Ghost signals are canceled from the composite density data and the composite color code data by the ghost canceling circuit 9. After canceling the ghost signals, the density data and the color code data are applied to the color selecting circuit 160.

The color code data applied to a terminal 161 of the color selecting circuit 160 is decoded by a decoder 164, and then the decoded color code signal is applied to OR circuits 166 to 169. Similarly, the contents of the color selection signals G1, G2 and G3 applied to a terminal 163 are decoded by a decoder 165 to select optional color image signals among all the color image signals including those from the red image signal to the black image signal.

A density selection signal for selecting density data of the color image signals from the OR circuits 166 to 169 is given to a density signal extracting circuit 170. The density selection signal selects the density data applied to a terminal 162 of the density signal extracting circuit 170. The selected density data are given to the binarizing circuit 30.

The color selection signals G1, G2 and G3 correspond respectively to extracted color image signals. In the normal color image recording mode, three-phase gate signals G1, G2 and G3 shown in FIGS. 12G to 12I synchronous with the rotation of the image retainer 61 are produced. At the same time, developing biases shown in FIGS. 12C, 12D and 12E are applied to the developing devices 65, 66 and 67, respectively, in synchronism with the rotation of the image retainer 61. Consequently, exposure-development processes I, II and III (in FIG. 12F) for the separate color images are carried out sequentially.

In the specified color recording mode, signals are processed for a single specified color image. Accordingly, the three color selection signals G1, G2 and G3 are provided in the same phase as shown in FIGS. 12G, 12H and 12I regardless of the specified color image signal. FIGS. 13A to 13I show signals for controlling the recording operation when the red image signal is specified, in which the developing bias R (in FIG. 13D) is applied only to the developing device 65 for developing a red image to actuate only the developing device 65 containing the red toner (developer), and thereby the image of the color document 1 is recorded in red irrespective of the color information of the color document 1.

When another color, namely, either black or blue, is specified, the same image reproducing process is executed, and hence the description of the image reproducing processes for the rest of colors will be omitted to avoid duplication.

Figure 14:
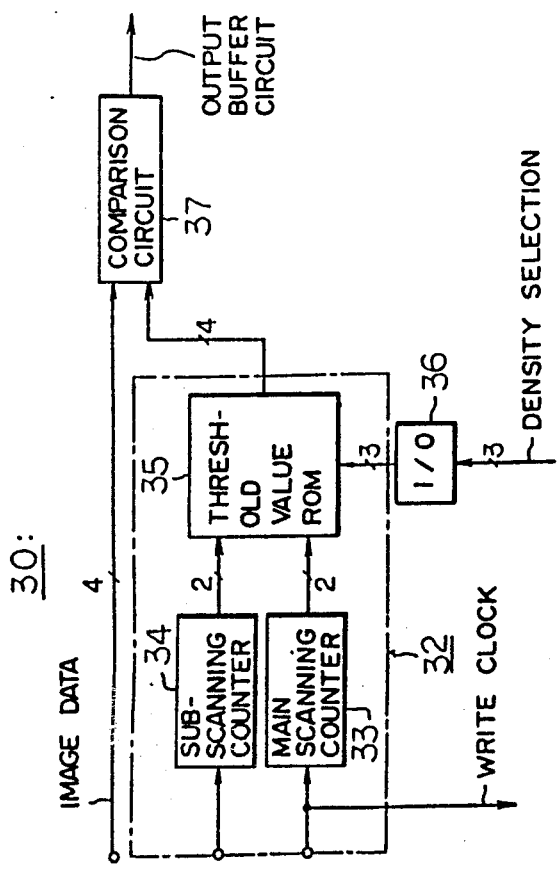
FIG. 14 is a block diagram of a binarizing circuit.

Referring to FIG. 14 showing the binarizing circuit 30, a threshold table 32 comprises a main scanning counter 33 for counting write clocks, a sub-scanning counter 34 for counting horizontal synchronizing signals, and a threshold value ROM 35, i.e., a threshold table.

When the image of a document is a line drawing, a fixed threshold data corresponding to the density of the line drawing is used. When the image of the document is a photographic drawing, a dither matrix is employed as threshold data because dither binarization is preferable. A dither matrix corresponding to the density of the document among three or so of dither matrices is selected.

Image data provided by the color selecting circuit 160 is compared with fixed threshold data from the threshold ROM 35 by a comparator 37 for a binarizing process to binarize the every picture element of the image data. It is possible to enlarge or reduce the original image data before binarization. The enlargement or reduction in the main scanning direction is achieved through electrical signal processing, while the enlargement or reduction in the sub-scanning direction is achieved by varying the moving speed of the CCDs 3 and 4 or the image information with the exposure time for the CCDs 3 and 4 fixed. The enlargement and reduction in the main scanning direction is executed by an image processing circuit which enlarges or reduces the original image data by an interpolation method. The interpolation method is an image processing method which enlarges or reduces an original image data on the basis of the levels of a neighboring pair original image data by increasing or curtailing data associated with the pair of original image data. For example, in doubling an original image data, an intermediate level S1 of two original image levels D1 and D2 is sampled, and the level S1 and the original image levels D1 and D2 are used as image data after enlargement, namely, interpolating data S.

The enlargement process and the reduction process real time processes. Accordingly, the interpolating data is stored beforehand in a ROM, and the interpolating data S is addressed by using the pair of original image data. Since these data are processed without being stored in a memory such as a RAM in the color extracting and ghost canceling processes, the color extracting and ghost canceling processes can be carried out in a real time processing mode. Accordingly, the operating speed of the processing apparatus is increased and the processing apparatus can be formed in a compact construction.

The interface circuit 40 (FIG. 5) comprises a first interface 41 which receives binary data, and a second interface 42 which receives the output binary data of the first interface 41. The first interface 41 receives a horizontal valid range signal H-VALID and a vertical valid range signal V-VALID from a timing circuit 43, clocks of a predetermined frequency (6 MHz, in this embodiment) from a counter clock circuit 44, and CCD driving clocks from tne CCD driving clock generating circuit 7. The first interface 41 gives binary data to the second interface 42 in synchronism with the CCD driving clocks only while the horizontal valid range signal and the vertical valid range signal are generated. The counter clock circuit 44 generates timing clocks for main scanning in synchronism with optical index signals. The second interface 42 gives the binary data received from the first interface 41 and other image data selectively to the output device 100.

The other image data include the following image data.

Firstly, test pattern data generated by a test pattern generating circuit 46, secondly, patch image data provided by a patch circuit 47, and thirdly, control data provided by a printer control circuit 45. The test pattern data are used for inspecting the image processing operation, and the patch image data for toner density detection are used for executing a patch process.

The test pattern generating circuit 46 and the patch circuit 47 are driven on the basis of clocks generated by the counter clock circuit 44 so that the test pattern generating circuit 46 and the patch circuit 47 function in timed relation with the binary data provided with the first interface 41. The output binary data of the second interface 42 are used as a modulation signal for modulating the laser beam in the output device 100.

In the output device 100 (FIG. 5), a laser driving circuit 101 for driving the semiconductor laser 81 receives the binary data as a modulating signal and internally modulates the laser beam on the basis of the modulating signal. The timing circuit 43 provides control signals to control the laser driving circuit 101 so that the laser driving circuit 101 is activated only during periods corresponding to the horizontal and vertical valid ranges. A signal representing the quantity of light of the laser beam is fedback to the laser driving circuit 101 and the laser driving circuit 101 controls the laser so the quantity of light of the laser beam is maintained at a fixed level.

The polygonal scanning mirror 85 is driven by a polygonal scanning mirror driving motor 104. The laser beam is deflected as the polygonal scanning mirror 85 rotates. A beam index sensor 105 detects the scanning start point of the deflected laser beam. The output signal of the beam index sensor 105, namely, a beam index signal, is converted into a voltage signal by an I/V amplifier 106, and then the voltage signal corresponding to the beam index signal is given to the counter clock circuit 44 to control the timing of optical main scanning operation. A polygonal mirror driving motor driving circuit 103 is turned on and off by control signals given thereto by the timing circuit 43.

All the devices and circuits shown in FIG. 5 are controlled by the first controller 200 and the second controller 250.

Referring to FIG. 5, a first microcomputer 201 of the first controller 200, and a second microcomputer 251 of the second controller 250 communicate with each other in a serial communication mode. The second controller 250 controls mainly the image reading system and the peripheral devices. The second microcomputer 251 controls the optical system. The first microcomputer 201 applies an optical scanning start signal directly to the interrupt terminal of the second microcomputer 251. The microcomputer 251 generates various command signals in synchronism with clocks of a predetermined frequency, for example, 12 MHz, generated by a reference clock generator 258. The second microcomputer 251 gives a command signal to the shading correcting memory 6 to make the latter detect and store shading correcting data, gives a density selection signal to the threshold table 35, and gives a color selection signal to the color selecting circuit 160 in the color recording mode. The second microcomputer 251 further gives control signals to a power source control circuit, not shown, to turn on and to turn off the CCD driving circuit for driving the CCDs 3 and 4, a control signal to a lighting control circuit 254 for controlling a light source 255 (a halogen lamp or the like) for illuminating the document 1, and gives a control signal to a stepping motor driving circuit 252 for driving a stepping motor 253 for moving the movable mirror unit of the image reading device 10. The second microcomputer 251 receives data representing the light quantity information of the light source 255 and the arrival of the carriage at the home position.

Figure 16:
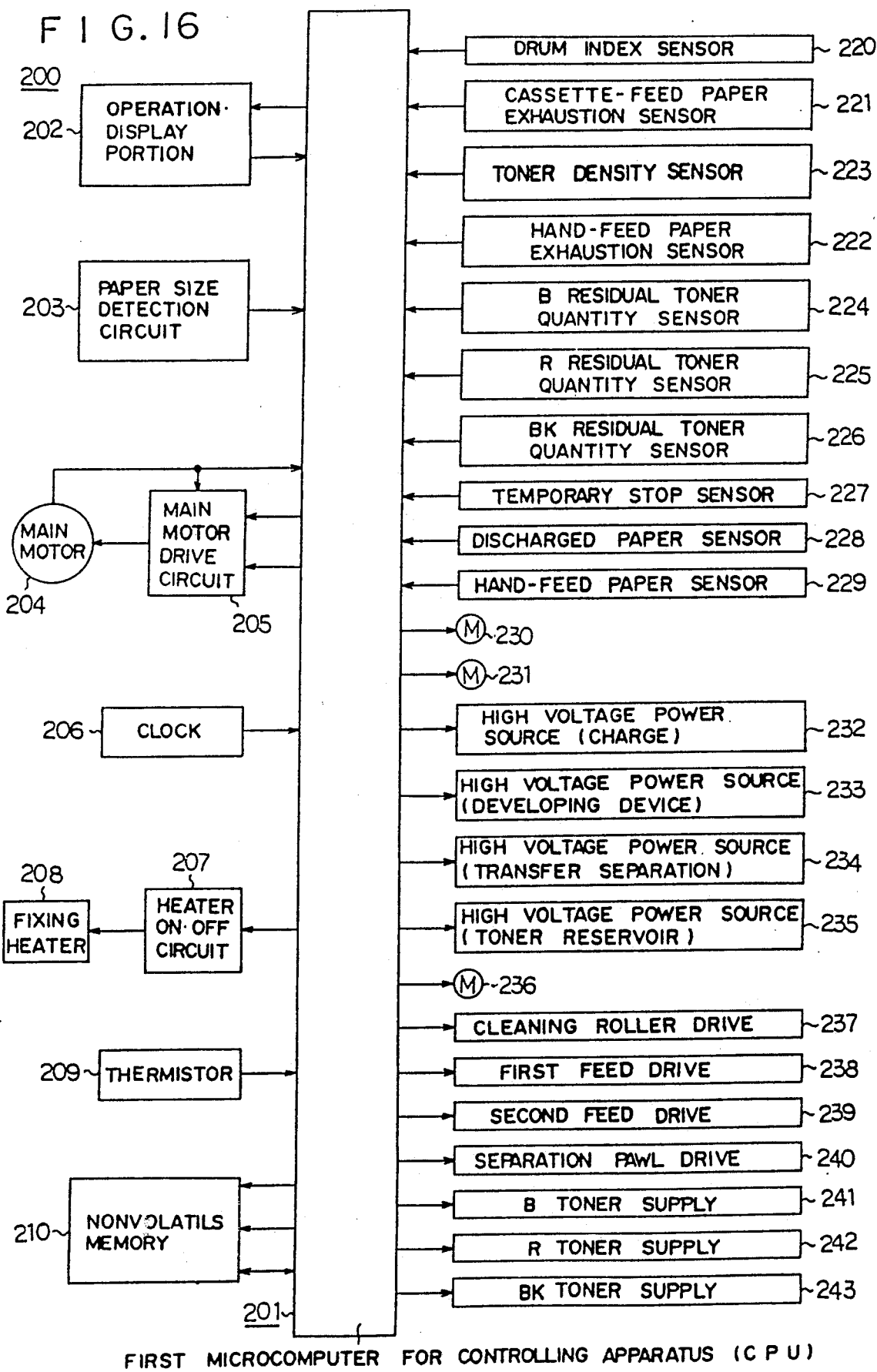
FIG. 16 is a block diagram of circuits associated with a first microcomputer.
Figure 15:
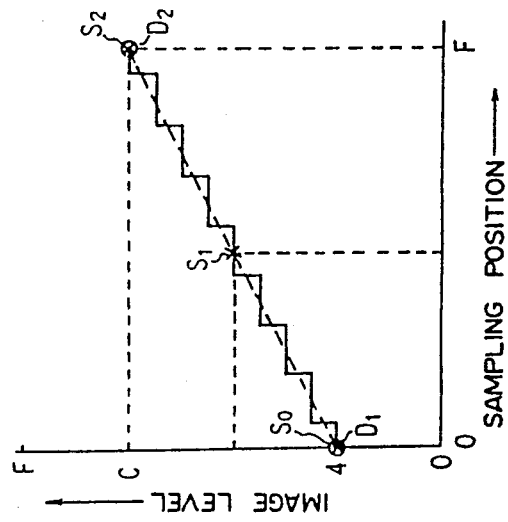
FIG. 15 is a graph of assistance in explaining interpolation.

The first microcomputer 201 controls mainly the color image reproducing machine. FIG. 16 shows the input and output systems of the color image reproducing machine connected to the first microcomputer 201.

An operation and indication unit 202 feeds various input data including a magnification, a recording position and a recording color to the microcomputer 201 and displays the contents of the input data, for example, by LEDs.

A sheet size detecting circuit 203 detects and indicates the size of copying sheets placed in a tray. The sheet size detecting circuit 203 is used also for automatically selecting copying sheet of a size according to the size of the document. A drum index sensor 220 detects the angular phase of the drum-shaped image retainer 61 and gives index signals for controlling the timing of the electrostatic processing operation. The constitution of the drum index detecting system will be described afterward.

A cassette-fed paper exhaustion sensor 221 detects the exhaustion of copying sheets contained in a cassette in the automatic feed mode. A hand-fed paper exhaustion sensor 222 detects the exhaustion of copying sheets in the hand feed mode.

A toner density sensor 223 detects the toner density of a toner image on the image retainer 61 or a fixed toner image.

Three residual toner quantity sensors 224, 225 and 226 detect the respective quantities of toners remaining in the developing devices 65, 66 and 67, respectively. When any one of the developing devices 65, 66 and 67 needs to be replenished with the toner, a corresponding toner replenishment pilot lamp, such as a LED, is turned on.

A temporary stop sensor 227 detects whether a copying sheet is fed correctly to the second paper feed roller, not shown, during the operation of the color image reproducing machine.

A discharge sensor 228 detects whether a copying sheet is discharged correctly after the fixing process.

A hand feed sensor 229 detects whether a hand feed tray is set in place. When the hand feed tray is set in place, a hand feed mode is established automatically.

Upon the reception of the output signals of the sensors, the first microcomputer 201 displays necessary data on the unit 202 and controls the color image reproducing machine according to the output signals of the sensors.

In the color image reproducing mode, the first microcomputer 201 controls a motor 230 for driving the developing devices for red and blue, and a motor 231 for driving the developing device for black. A driving circuit 205 of a PLL (phase-locked loop) system controls a main motor 204 for driving the image retainer 61. The driving circuit 205 is controlled by the first microcomputer 201.

During color image reproducing operation, a predetermined high voltage is applied to the operative developing device. A high-voltage power source 232 for charging, a high-voltage power source 233 for development, a high-voltage power source 234 for transfer and separation and a high-voltage power source 235 for toner reservoir apply predetermined high voltages to the related devices, respectively, at an appropriate moment.

Shown also in FIG. 16 are a cleaning device operating motor 236, a cleaning roller driving motor 237, a first paper feed roller driving unit 238, a second feed roller driving unit 239 and a separating pawl driving unit 240.

A first feed roller feeds a copying sheet to the second feed roller, and then the second feed roller feeds the copying sheet to the image retainer 61 so that the copying sheet is positioned correctly relative to a toner image on the image retainer 61.

The first microcomputer 201 controls a fixing heater control circuit 207 for the on-off control of a fixing heater 208.

The first computer 201 controls the fixing temperature at an appropriate temperature on the basis of a temperature feedback signal provided by a thermistor 209.

A clock generating circuit 258 generates clocks of a predetermined frequency on the order of 15 MHz.

A nonvolatile memory 210 added to the first microcomputer 201 stores data such as the count of a total counter and predetermined initial values which must be retained even if the image reproducing machine is disconnected from the main power source.

Thus, the first microcomputer 201 and the second microcomputer 251 carries out various modes of control operation necessary for color image processing according to a predetermined sequence.

Figure 18:
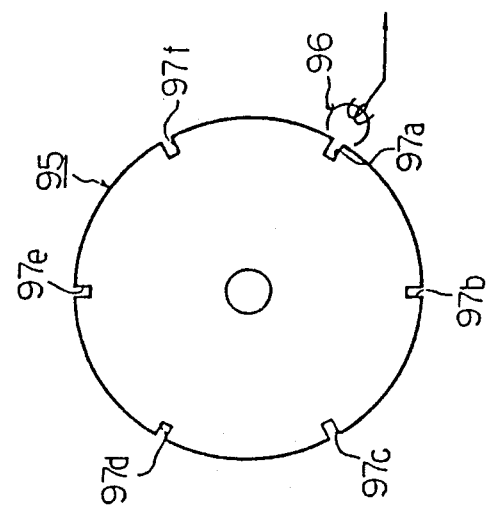
FIG. 18 is a plan view of a drum index element.
Figure 17:
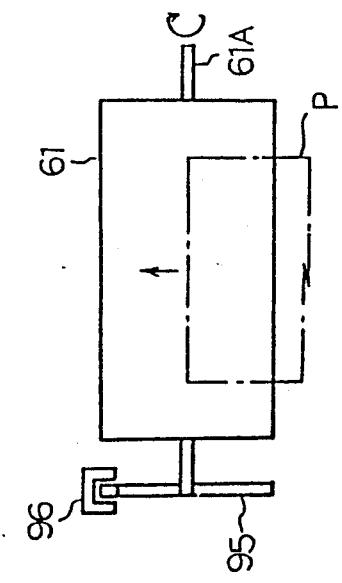
FIG. 17 is an illustration showing the relation of an image retainer and a drum index device.

Referring to FIG. 17 showing a drum index signal detecting system, an index disk 95 is mounted fixedly on one end of a shaft 61A of the image retainer 61 for rotation together with the image retainer 61. As shown in FIG. 18, a plurality of U-shaped index slots having a predetermined depth and a predetermined width are formed in the periphery of the index disk 95 at regular angular intervals. In this embodiment, six index slots 97a to 97f are provided at angular intervals of 60° to obtain six index signals for every one turn of the image retainer 61. An index sensor 96 is disposed opposite to the periphery of the index disk 95. The index sensor 96 generates an index pulse every passage of each of the index slots 97a to 97f across the index sensor 96 shown in FIG. 27 A) to detect the angular phase of the image retainer 61. Drum index disk 95 may be formed on the circumference of the image retainer 61 at an position where the drum index means will not interfere with a copying sheet being conveyed along the circumference of the image retainer 61.

A series of steps of the color image reproducing process will be described hereinafter with reference to FIGS. 19 to 21. The color image processing apparatus in this embodiment is capable of monochromatic image reproducing process in which an image is reproduced in a single color specified by an external color specifying means as well as a multicolor image reproducing process in which an image is reproduced in three colors, for example, red, blue and black.

First the multicolor image reproducing process will be described with reference to FIGS. 19 and 20. In a period F1, the color image processing apparatus is connected to the main power supply and the copy start button is operated to start the apparatus. In a period F2, the image retainer 61 is driven for the prerotation. Periods I, II, III and IV are a blue developing period, a red developing period, a black developing period and a postrotation process period, respectively. Numerals indicated in FIGS. 19 and 20 are counts counted by a drum rotation counter or other counter such as a prerotation counter.

When the main switch is turned on, the main motor 204 rotates for a predetermined period. When the copy start button is operated, the main motor 204 is started (FIG. 19 C). Upon the detection of one of the index slots 97a to 97f for the first time by index sensor 96, the drum rotation counter is cleared (FIGS. 19A and 19B). The subsequent steps of the color image processing operation is executed on the basis of the count of the drum rotation counter. The respective lengths of the periods I to IV are equal to each other. In this embodiment, the image retainer 61 rotates one full turn in 778 counts. At the beginning of the prerotation period F2, charging operation for charging the image retainer 61 is started (FIG. 19 D). The charging operation continues until a position on the circumference of the image retainer 61 where the exposure operation has been started arrives at the charging position (period IV). The lamp before transfer is turned on at about the middle of the prerotation period F2 and is kept turned on for a fixed period to the middle of the blue developing period I for the preparatory process of color image development.

In each of the blue, red and black developing periods, the developing sleeve 75 and the magnet roller 76 of the corresponding developing device among the developing devices 65, 66 and 67 are rotated and the developing bias is applied to the relevant developing device in synchronism with the rotation of the developing sleeve 75 and the magnet roller 76 (FIGS. 19 F to 19 K). When the first drum index pulse is detected in the prerotation period F2, the cleaning blade 94 is pressed against the circumference of the image retainer 61 to remove the toner remaining on the image retainer 61 (FIG. 19 L). The cleaning blade 94 is retracted from the image retainer 61 after the image retainer has turned one full turn (FIG. 19 M) after the engagement of the cleaning blade 94 with the image retainer 61. The cleaning roller is actuated a little moment after the cleaning blade 94 has been retracted (FIG. 19 N) to remove the toner still remaining on the circumference of the image retainer 61 in order to clean the circumference of the image retainer 61 perfectly and to prevent the residual toner from scattering.

Immediately before the blue developing period I, the first feed roller is actuated to feed a copying sheet to the second feed roller (FIG. 19 0). The first feed roller draws out the copying sheet from a cassette. The second feed roller is actuated at an appropriate moment to feed the copying sheet fed thereto to the image retainer 61. The second feed roller is actuated at a time in the last exposure period III (FIG. 19 P). Upon the detection of the arrival of the copying sheet at the second feed roller by the temporary stop sensor 227, the first feed roller is stopped. The output of the temporary stop sensor drops to zero upon the passage of the copying sheet through the second feed roller (FIG. 19 S).

The transfer process is started with slight delay after the actuation of the second feed roller and, at the same time, a predetermined AC voltage is applied to a sheet separating electrode to prevent the adhesion of the copying sheet to the circumference of the image retainer 61 in transferring a toner image from the image retainer 61 to the copying sheet (FIG. 19 Q).

After the output level of the temporary stop sensor 227 has dropped to zero, the developing and fixing processes are completed, and then the discharge sensor 228 detects the discharge of the copying sheet (FIG. 19 T).

In the color image reproducing mode, the toner density detection is executed for each developing process. Timing of toner density detection is determined on the basis of the respective counts of a blue detecting counter U2, a red detecting counter U3 and a black detecting counter U4. The detecting counters U2, U3 and U4 are reset with reference to the start of density detecting patch write operation. The blue detecting counter U2 is reset when the count of the drum rotation counter reaches 706. The blue toner density is detected when the count of the blue detecting counter after reset reaches 602. Similarly, the red detecting counter and the black detecting counter are reset when the count of the drum rotation counter reaches 707. The toner density is detected in a specific image area. Accordingly, a toner density detecting signal (FIG. 19 R) is provided after a predetermined period from the provision of a density detecting patch signal (FIG. 19 Z), for example, an image signal corresponding to an image area having a size of 8×16 mm, to detect the toner density of an image in the specific area.

A prerotation counter U1 is cleared upon the generation of the first pulse of the drum index signal after the copy start button has been operated. The prerotation of the image retainer 61 is terminated when the count of the prerotation counter reaches 1266 (FIG. 19 U).

Upon the connection of the color image processing apparatus to the main power source, the polygonal scanning mirror driving motor 104 is actuated to rotate the polygonal scanning mirror 85 continuously at a fixed speed (FIG. 19 V).

Image data necessary for reproducing an image is provided in the following manner. Upon the start of the counting operation of the blue counter, a video gate becomes "1". The video gate becomes "0" upon the completion of black image data write operation (FIG. 19 W). The image data is given to the output device 100 only while the video gate is "1".

The vertical valid range signal V-VALID is provided for a fixed period (a period in which the count reaches 528 when the size of the copying sheet is A4) for each developing process (FIG. 19 Y).

The first microcomputer 201 gives a copy start signal and an optical scanning start signal to the second microcomputer 251 for controlling the optical scanning system (FIG. 19 AA). The optical scanning operation is started at the trailing edge of the optical scanning start signal where the optical scanning start signal changes from "1" to "0" (FIG. 19 BB).

When the image reading device 10 has a movable mirror unit provided with a light source, the second microcomputer 251 gives a home position signal indicating the arrival of the movable mirror unit at the home position to the first microcomputer 201 every developing process (FIG. 19 CC). Upon the reception of the home position signal, the first microcomputer 201 gives a copy R signal (FIG. 19 AA) to the second microcomputer 251 when the next exposure process is to be executed successively (FIG. 19 DD).

In reproducing a color image in a single color specified by means of an external device, only image reproducing processes for the specified color are carried out in a sequence defined by time charts shown in FIGS. 21A to 21X and the rest of the image reproducing processes is not executed. Since the image reproducing processes for the specified color is part of the foregoing image reproducing processes described in the preceding paragraph, the description thereof will be omitted. The time chart shown in FIGS. 21A to 21X are for the image reproducing processes for reproducing an image in black (black-and-white copy).

Thus, a series of foregoing color image reproducing processes is controlled by the first microcomputer 201 and the second microcomputer 251. Control programs to be executed by the first microcomputer 201 and the second microcomputer 251 will be described hereinafter with reference to FIG. 22 and the following figures.

First, a main control program will be described with reference to a flow chart 300 shown in FIG. 22.

Upon the connection of the color image reproducing apparatus to the main power source, the control program is started to initialize the color image reproducing apparatus in step 301. In step 302, a heading processing is executed to set the image retainer 61 at a predetermined initial angular phase by using the index signal provided by the index sensor 96.

Then, steps 303, 304, 305 and 306 are executed in that order. In step 303, a warm-up process is executed to turn on the document illuminating lamp and to warm up the fixing device. In step 304, a data input process is executed to feed copying data, to specify color and the number of copies to be produced. In step 305, a fixing heater control process is executed to adjust the temperature of the fixing heater. In step 306, an idling jamming process is executed to clear jamming sheets. In step 307, a decision is made whether the foregoing preparatory processes have been completed. When the decision in step 307 is "No", the routine returns to step 303 to repeat steps 303 to 306. When the decision in step 307 is "Yes", a decision is made in step 308 whether the copy start button of the operating unit is pressed. When the decision in step 308 is "No", the routine returns to step 304 to wait further copying data input operation. When the decision in step 308 is "Yes", the input data including copying color, a print density and a copying sheet size specified by operating the operating unit are given from the first microcomputer 201 to the second microcomputer 251 in a serial transmission mode in step 309. In step 310, a decision is made whether a monochromatic image reproducing mode is selected. When the decision in step 310 is "Yes", a monochromatic image reproducing operation control routine (subroutine) is executed in step 320. When the decision in step 310 is "No", namely, when a two-color image reproducing mode or a three-color image reproducing mode is selected, a two-color image reproducing operation control routine (subroutine) or a three-color copying operation control routine (subroutine) is executed in step 360.

After step 320 or 360 has been accomplished, the control operation returns to the main routine to execute a sheet size and density process (step 311), a fixing heater process (step 312) and an operating jam process (step 313). Then, in step 314, a decision is made whether the specified copying operation has been completed. When the decision in step 314 is "No", the routine returns to step 310 and, when "Yes", the routine returns to step 304.

FIG. 23 is a flow chart explaining the control of an image reproducing operation in the monochromatic image reproducing mode.

When the monochromatic image reproducing mode is specified, a decision is made in step 321 whether a copy number flag is set. The copy number flag is set each time a copying sheet is fed to the second feed roller. When the decision in step 321 is "No", namely, when the copy number flag is not set, the routine jumps to step 325. When the decision in step 321 is "Yes", copy number data is processed in step 322. When the copy number is smaller than a set copy number which is set beforehand, the routine goes to step 325. When the copy number coincides with the set copy number, a copy number end flag is set in step 324. Then, a copying sheet feed process is executed in step 325, a write process by the laser 81 is executed in step 326, and a high-voltage power source activation process is executed to activate the high-voltage power sources 232 to 235 in order to apply high voltages respectively to the charging device, the developing device 65, 66 or 67, and the transfer device etc. in step 327. After the foregoing steps have been executed, steps 328 through 336 are executed for a developing process. In the developing process, the respective developing operation start timings for the developing devices are checked. In the monochromatic image reproducing mode, only one of the developing devices 65, 66 and 67 corresponding to the specified color is operated, however, every developing operation start timing is checked regardless of color specification. The manner of controlling the developing process will be described hereinafter on an assumption that the specified color is red, for convenience' sake.

In step 328, a decision is made whether the red developing start timing coincides with red developing process start timing. When the decision in step 328 is "Yes", a decision is made in step 329 whether a red copy flag is set. When the decision in step 329 is "Yes", the red developing process is started in step 330.

Since only red is specified for monochromatic image reproducing operation, steps for the blue and black developing processes are skipped, and then a decision is made in step 337 whether the developing operation is to be ended. When the decision in step 337 is "Yes", the developing process is ended in step 338, and then a decision is made in step 339 whether inversion copy is specified. When the decision in step 339 is "Yes", an inversion bit of a register is set in step 340 and, when "No", the inversion bit of the register is reset in step 341.

Then, a decision is made in step 342 whether an end flag is "1", namely, whether the number of copies produced coincides with a set copy number. When the decision in step 342 is "No", a decision is made in step 345 whether the optical scanning system is located at the home position. When the decision in step 345 is "Yes", a next copy sequence start flag is set in step 346.

In step 347, a decision is made whether a scanning operation start time has arrived. When the decision in step 347 is "Yes", a scanning operation start signal is given to the second microcomputer 251 in step 348, and a timer (a 10 msec timer, in this embodiment) for regulating a write timing is restarted in step 349. When the scanning of the optical scanning system from the home position to the far end of the document is carried out, a write start state is established. When the timer is restarted, a flag for the vertical valid range signal V-VALID is set and the corresponding counter is cleared (steps 350 and 351). Thus, an image write mode using a red image signal is established, the electrostatic latent image of the separated red image is formed, and then the same electrostatic latent image is developed. When the counter is cleared, a decision is made in step 352 whether the end flag is "1". When the decision in step 352 is "Yes", the postrotation process and the heading process of the drum 61 are executed in step 354, and then, the control operation returns to the main routine.

The same processes are executed when a color other than red is specified. That is steps 331 through 333 are executed when blue is specified and steps 334 through 336 are executed when black is specified, namely, when a black-and-white copying mode is specified, instead of steps 328 through 330.

The monochromatic image reproducing routine 320, the sheet size and density process of step 311, the fixing heater control process of step 312 and the operating jam process of step 313 are executed repeatedly until the specified image reproducing operation is completed.

Figure 24:
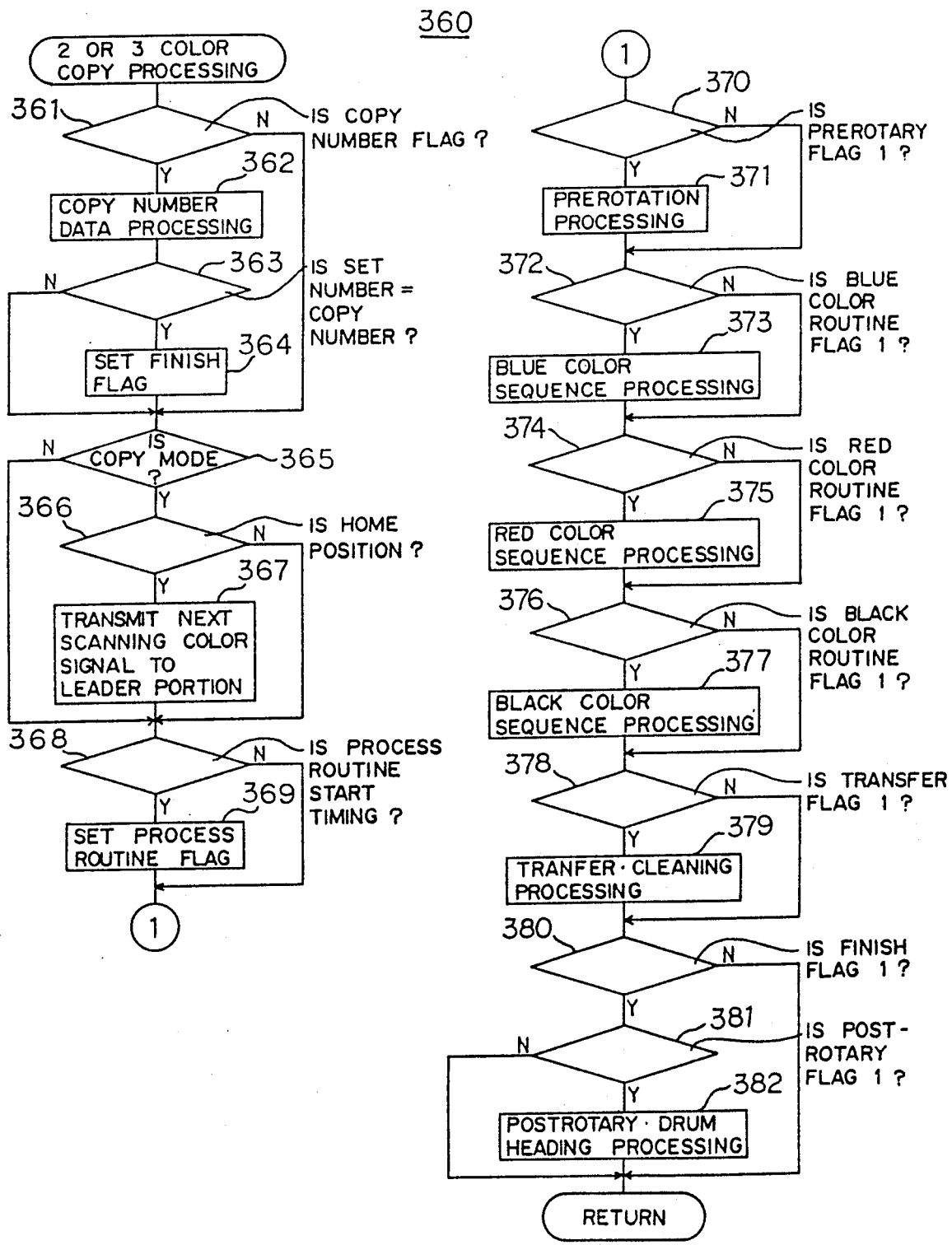

FIG. 24 shows a control program for controlling the color image processing apparatus in the two-color or three-color image reproducing mode.

In the two-color or three-color image reproducing mode, the control sequence from step 361 for deciding the state of the flag indicating the number of copies to step 364 for setting an end flag is the same as that for monochromatic image reproducing mode. In step 365, a decision is made whether a copy mode is established. When the decision in step 365 is "Yes", a decision is made in step 366 whether the optical scanning system is at the home position. When the decision in step 366 is "Yes", a signal indicating a color image to be scanned in the next scanning cycle is given to the second microcomputer 251 in step 367. Then, a decision is made in step 368 whether color development routine start time has arrived. When the decision in step 368 is "Yes", a color development routine flag is set in step 369. When the decision in step 365 is "No" or when the decision in step 366 is "No", the routine jumps to step 368.

After the developing routine flag has been set, a decision is made in step 371 whether the prerotation flag is "1". When the decision in step 370 is "Yes", the prerotation process is executed in step 371, and then steps respectively for the selected colors are executed.

First, a decision is made in step 372 whether a flag for a blue color routine is "1". When the decision in step 372 is "Yes", a blue color sequence is executed in step 373. Steps 374 and 375 and steps 376 and 377 are for red color routine and for black color routine, respectively, similar to steps 372 and 373 for blue color routine.

Thus, in the multicolor image reproducing mode, all the color routines are executed and, in the two-color image reproducing mode, only the color routine for the specified colors are executed.

After the color image reproducing sequences have been accomplished, a decision is made in step 378 whether the transfer flag is "1". When the decision in step 378 is "Yes", the transfer device and the developing devices 65, 66 and 67 are cleaned. Then, in step 380, a decision is made whether the end flag is "1". When the decision in step 380 is "Yes", a decision is made in step 381 whether the postrotation flag is "1". When the decision in step 381 is "Yes", the image retainer 61 is rotated for the postrotation process and for the heading process of the drum in step 382.

Figure 25:
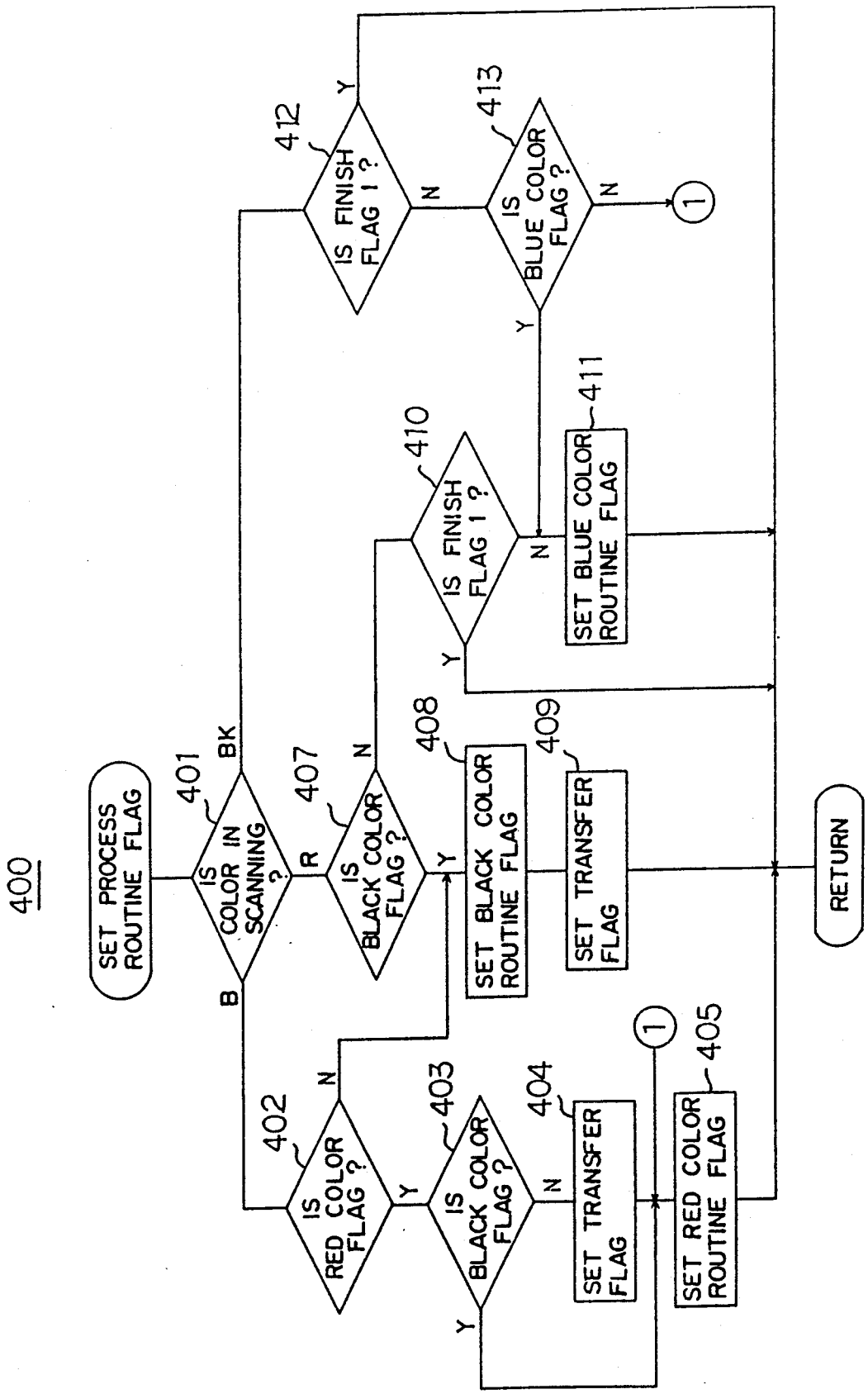

When a flag for the color process routine is set, a color process identification routine 400 shown in FIG. 25 is executed. In step 401, a decision is made as to which color image is being scanned. Since the optical scanning operation is carried out first for a blue image, a decision is made in step 402 whether a flag for red image reproducing process is set. When the decision in step 402 is "Yes", a decision is made in step 403 whether a flag for black image reproducing process is set. When the decision in step 403 is "Yes", a flag for the red color routine is set in step 405. When the decision in step 403 is "No", a flag for transferring a blue image is set in step 404.

When the flag for the red color routine is not set, a flag for the black color routine is set in step 408, and then a flag for transferring a black image is set in step 409.

When the optical scanning cycle for the blue image is changed for that for the red image, a decision is made in step 407 whether a flag for the black color routine is set. When the decision in step 407 is "Yes", the routine goes to step 408 and, when the decision in step 407 is "No", a decision is made in step 410 whether an end flag is set. When the decision in step 410 is "No", a flag for the next routine, namely, the blue color routine, is set in step 411.

When the optical scanning system is operating for the black image and the end flag is set, the control operation returns to the two-color or three-color routine. When the end flag is not "1" (step 412), a decision is made in step 413 whether a flag for the blue color routine is set and, when "Yes", a flag for the blue color routine is set in step 411. When the decision in step 413 is "No", the routine returns to step 405 to set the flag for the red color routine.

The color processing identification routine is thus constituted because it is possible that two colors are specified or three colors are specified and it is necessary to execute the color processing after identifying the specified colors so that the color processing can be carried out regardless of the specified colors.

In the two-color or three-color image reproducing mode, the image retainer 61 is rotated two or three turns to form and develop two or three electrostatic latent color images sequentially on the circumference of the image retainer 61, and then a multicolor image developed on the image retainer 61 is transferred and fixed. Accordingly, in the multicolor image reproducing mode, it is very important to form the succeeding electrostatic latent color image in register with the preceding developed color image. Faulty registration of color images deteriorates the quality of the reproduced multicolor image remarkably.

The prerotation process, the postrotation process and the image write process are carried out in synchronism with the rotation of the image retainer 61 with reference to drum index signals.

Figure 26:
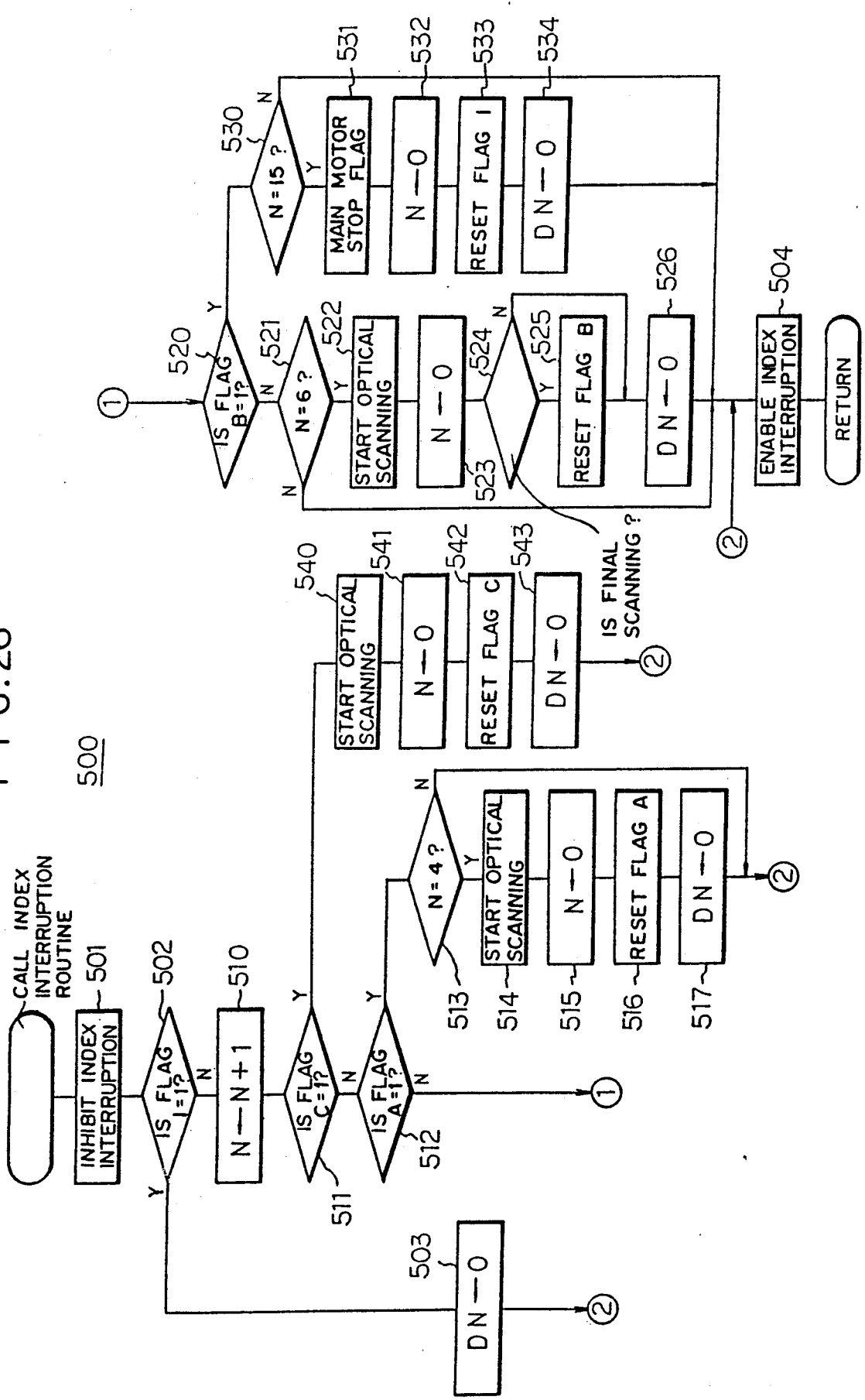

FIG. 26 shows a control routine for controlling the prerotation process, the postrotation process and the image write process.

The drum index signal has pulses generated upon the detection of the six slots 97a to 97f of the index disk 95 mounted on the image retainer 61 for rotation together with the image retainer 61. The slots 97a to 97f respectively corresponding to particular angular positions of the image retainer 61 are detected by the optical or electromagnetic index sensor 96. The optical image write starting position is determined beforehand so as to coincide with one of the particular angular positions of the image retainer 61. Accordingly, the image write starting position can be varied relative to the angular position of the image retainer 61, and the period of the prerotation process can be regulated on the basis of the drum index signal.

FIGS. 27A and 27B are time charts for a control operation for controlling the prerotation process, the postrotation process and the image write process on the basis of the drum index signal provided by the index sensor 96 by detecting the six slots 97a to 97f of the index disk 95. As obvious from FIGS. 27, the respective periods of the prerotation process and the postrotation process are reduced, and thereby the image reproducing efficiency of the color image processing apparatus is improved. That is, as stated previously with reference to FIG. 33, the image retainer 61 needs to be rotated one turn for the prerotation process and two turns for the postrotation process when an index disk having only one slot is employed, whereas, according to the present invention employing the index disk 95 having the six slots 97a to 97f, the image retainer 61 is rotated ⅔ to ½ turn for the prerotation process and 1.5 turns or so for the postrotation process. In this embodiment, the period of the prerotation process and that of the postrotation process correspond to four pulses and ten pulses of the index signal, respectively. Six pulses of the index signal correspond to one turn of the image retainer 61. The number of pulses of the index signal for the prerotation process or the postrotation process is varied selectively to vary the image write starting position on the image retainer 61 to reduce the fatigue of the image retainer 61. In this embodiment, the image write start position for the second image write cycle is shifted by a distance corresponding to one pulse of the index signal from the image write starting position for the first image write cycle.

Upon the detection of the index signal (in FIG. 27 A), an index interruption routine 500 is started. In step 501, the interruption of signals other than the index signal is inhibited to prevent the malfunction of the control process routine due to external pulse noises other than the pulses of the index signal.

The index interruption inhibit period is slightly longer than a preparatory period from the detection of a pulse of the index signal to the start of the image write operation, or is a period until the successive pulse of the index signals. Since the image write starting timing must be decided on the basis of the index signal so as to be synchronized with the rotation of the image retainer 61, the index signal and the signals other than the index signal must be inhibited during the preparatory period. The interruption inhibit period is detected in step 555 inserted in a routine 530.

After the index interruption inhibit step has been executed, a decision is made in step 502 whether a flag I is "1". The flag I is "0" only for the multicolor image reproducing mode and is "1" for modes other than the multicolor image reproducing mode, such as the monochromatic image reproducing mode, the standby mode, a state in which the power source is turned on, and at a moment immediately before the end of the postrotation in the multicolor image reproducing mode.

In the monochromatic image reproducing mode, the start of the optical scanning system need not be determined relative to the angular phase of the image retainer 61 on the basis of the index signal. Therefore, in the monochromatic image reproducing mode, a drum counter DN is cleared in step 503, then the interruption of signals other than the index signal is enabled in step 504, and then the control operation returns to the main routine.

In the multicolor image reproducing mode, the flag I is reset for "0" in the main routine. In the multicolor image reproducing mode, the count of a drum index interrupt counter N is increased by an increment of one for every interruption of the index signal. The counter N is cleared in step 510 by the main routine immediately after the copy start switch has been turned on. When the count of the counter N is increased by an increment of one, a decision is made in step 511 whether a flag C is "1". The flag C is set for "1" by the main routine when the optical scanning system arrives at the home position in the continuous image reproducing mode. When the index signal is given, the flag C is reset.

The manner of control operation for producing a single copy in a single copy producing mode will be described for convenience' sake.

In step 512, a decision is made whether a flag A is "1". The flag A is "1" during the prerotation process and is set by the main routine when the copy start switch is turned on. Since the prerotation process is started when the copy start switch is turned on, the number of pulses of the index signal is checked in step 513 by inspecting the contents of the counter N. Initially, the count of the counter N is 0 and hence the routine goes to step 504. When the count of the counter N increases to four, the optical scanning operation is started in step 514, the counter N is reset in step 515, the flag A is reset in step 516, and the counter DN is reset in step 517. These steps are executed in a period $T_0$ (FIG. 27 B).

Since the flags I, C and A are "0" in the next step, a decision is made in step 520 whether a flag B is "1$3\underline{8}$". The flag B is "1" when the postrotation process is to be executed. The flag B is set when the last optical scanning cycle is started. Since the flag B is "0" when the optical scanning operation is started in step 514, an electrostatic latent first color image is formed and the electrostatic latent first color image is developed in step 521. The optical scanning system starts a return travel after the image retainer has turned through a predetermined angle (a period $T_1$ in FIG. 27 B) and arrives at the home position in a fixed time (periods $T_2$ and $T_3$). When the image retainer is turned one turn, the count becomes 6. Therefore, upon the arrival of the count at six, the optical scanning system is started again for optical scanning operation and the counter N is reset (steps 521, 522 and 523). In step 524, a decision is made whether the present optical scanning cycle is for the last color image. When the decision in step 524 is "No", the drum counter DN is reset in step 525. Upon the arrival of the count again at six, a color image reproducing process for the third color image is started (a period $T_4$ in FIG. 27 B), and hence the decision in step 524 is "Yes". Then, the flag B is set for "1" in step 525. Since the flag B becomes "1$3\underline{8}$ in the color image reproducing process for the third color image, the index signal is monitored in step 530. The third color image reproducing process is ended when the image retainer is turned one turn, however, the image retainer continues rotating for the postrotation process (a period $T_5$). The pulses of the index signal is counted up from zero from the beginning of the period $T_4$. When the count of the pulses of the index signal arrives at fifteen, the main motor is stopped to end the postrotation process and, at the same time, the counters N and DN are reset and the flag I is set and the color image processing apparatus returns to a state before the image reproducing operation (steps 531 to 534).

In a continuous copying mode, the flag C is "1", and hence the first optical scanning cycle is executed in step 540. The counters N and DN are reset and the flag 0 is reset in steps 541, 542 and 543 as in the single copy producing mode. Thereafter, steps as those executed in the single copy producing mode are executed. Incidentally, the number of index may be counted by measuring time.

As shown in FIG. 27 A, upon the arrival of the count at four after the color image reproducing apparatus has been started, the color image reproducing cycle for the first color image is started and the counter N starts counting the pulses of the index signal from zero. The color image reproducing cycle is restarted each time the count arrives at six until the three color images are reproduced. The postrotation process is ended in a period corresponding to a count of fifteen to wait for the next copy starting operation.

Note the count of the pulses of the index signal in the postrotation process. In FIG. 27A, numerals printed below are the total count of the pulses of the index signal counted from the starts of the prerotation and postrotation processes, while numerals printed above are the count of the pulses of the index signal counted by resetting the counter each time when the image retainer rotates one time and hence the count arrives at six. In the first copying operation, the image reproducing process for the first color image is started at a position on the image retainer corresponding to a count "1" printed above in FIG. 27A and, in the second copying operation, the image reproducing process for the first color image is started at a position on the image retainer corresponding to a count "2" printed above in FIG. 27 A. Thus, the starting position of the image reproducing process for the first color image in the first copying cycle and that in the second copying cycle on the image retainer are different from each other. That is, the starting position of the image reproducing process is variable, and hence the start timing of another image forming cycle by using another of the reference signal and the starting position of the image reproducing process shifts over the circumference of the image retainer.

Furthermore, the prerotation process can be started from a position where an index signal corresponding to the least processing time can be obtained, because the index signal has a plurality of pulses which are generated in a period corresponding to one turn of the image retainer. The same is true with the period of the postrotation process. Accordingly, in either case, the least necessary period can be set for the process.

FIG. 28 shows a timer interruption routine 550 for regulating the write timing. The timer interruption routine is carried out at regular intervals determined by a reference timer. In step 551, a decision is made whether a vertical valid range signal (V-VALID) flag is set. When the decision in step 551 is "Yes", a decision is made in step 552 whether the count of a counter for counting the vertical valid range signal (V-VALID) coincides with a scan start count indicating the color image write starting point. That is, when the index signal is given, a counter for counting the vertical valid range signal (V-VALID) starts counting and, upon the arrival of the count of the counter at a predetermined value corresponding to the preparatory period, the color image write operation by the laser is started. Accordingly, after the count of the counter has coincided with the scan start count, the vertical valid range signal (V-VALID) is given to the timing circuit 102, and then the flag of the vertical valid range signal (V-VALID) is reset (steps 553 and 554).

If the reference timer is restarted in timed relation with the index signal, a period between a moment when the index signal is provided and the end of the preparatory period is fixed regardless of the number of turns of the image retainer even if the mode of interruption of the index signal varies from time to time. Consequently, the position of the leading edge of the document and the angular phase of the image retainer, namely, the image data write timing, coincide always with each other.

When the flag of the vertical valid range signal (V-VALID) is not set and when the count of the counter for the vertical valid range signal (V-VALID) is not in coincidence with the scan start count, the routine goes directly to step 555. In step 555, the count of an inhibit counter is checked. Step 555 is executed to inhibit the reception of signals other than the index signal in order to prevent faulty image write operation due to noises generated in the preparatory period. Therefore, the inhibit counter is set for a count corresponding to the preparatory period or to a period from a moment when a pulse of the index signal is generated to a moment before the next pulse of the index signal. After the count of the counter for the vertical valid range signal (V-VALID) has coincided with the count of the inhibit counter, the optical scanning system can be started. Therefore, in such a state, the index interruption flag is reset and the index interruption unable mode is cancelled (steps 556 and 557).

The count of the counter for the vertical valid range signal (V-VALID) is increased by an increment at a time, processes other than those related with registration are executed, and then the control operation returns to the main routine (steps 558 and 559).

The foregoing control programs are executed by the first microcomputer 201.

Control programs to be executed by the second microcomputer will be described hereinafter with reference to FIG. 29 and the following figures. The second microcomputer 251 mainly controls the optical scanning system.

Referring to FIG. 29 showing a main routine for controlling the optical scanning system, in step 601, the second microcomputer 251 is initialized and memories are cleared, search for the position of the optical scanning system is started in step 602, a warm-up timer is started in step 603, and then the warm-up process is started in step 604. In step 605, a decision is made whether the warm-up process is completed and, if not, a decision is made in step 606 whether a warm-up period has terminated. If the warm-up has terminated before the warm-up process is completed, an alarm is displayed in step 607.

Upon the completion of the warm-up process, the warm-up timer is stopped in step 608 and, at the same time, the light source such as a fluorescent lamp or the like for illuminating the document 1 is turned off in step 609.

Then, a decision is made whether any image reproducing mode is called. When an image reproducing mode is called, the light source is turned on, the quantity of light reflected by the document 1 is monitored, an alarm is displayed when the quantity of light reflected by the document 1 is insufficient, a ready flag is set when the quantity of light is normal, a ready signal is given to the microcomputer 251, and the optical scanning system is initialized (steps 610 to 615).

After the optical scanning system has been initialized, a decision is made whether a pulse count check flag is set, a decision is made whether the optical scanning system is on the scanning travel in the feed direction when the pulse count check flag is set, and a decision is made on the basis of the count of the pulses whether the optical system has traveled through a predetermined distance (steps 616 to 618). In case the optical scanning system has not yet traveled through the predetermined distance, a pulse interval time is set, an excitation pattern is set and a current is set on a predetermined level (steps 619 to 621). Then the pulse count check flag is reset in step 622, and then the routine returns to step 616.

When the optical scanning system is advanced in the feed direction to the limit scanning position, the count reaches a predetermined value. Then, the optical system is stopped and an advancement flag is reset (steps 623 and 624).

In step 617, a decision is made whether the optical scanning system is on the return travel. When the carriage of the optical system is on the return travel, the decision in step 617 is "No". When the optical scanning system is on the return travel, the count of pulses is checked in step 630 to see whether the optical scanning system has traveled in the return direction by a predetermined direction. In case the scanning system has not yet traveled through the predetermined distance, the pulse interval time is set in step 631, the excitation pattern is set in step 632, and then the routine goes to step 622.

Upon the arrival of the optical scanning system at the home position, the count of pulses coincides with the predetermined count, the second microcomputer 251 gives a home position signal to the first microcomputer 201, and then a decision is made again whether any image reproducing mode is called (steps 633 to 635). Step 635 is executed whether the continuous copying mode is selected. When the single copy producing mode is selected, the light source is turned off in step 636, and then the routine returns to step 610. When the continuous copying mode is selected, the routine returns to step 612.

Referring to FIG. 30 showing an optical scanning system control program 650, upon the start of a timer interruption routine for changing over a timer for controlling an excitation pattern for driving the pulse motor 253, an excitation pattern changeover signal is given to the driving circuit 252 for driving the pulse motor 253 for driving the optical scanning system in step 651, and then the level of current supplied to the pulse motor 253 is changed in step 652. Then, the timer is set, a pulse counter counts up, a pulse count check flag is set, and then the control operation returns to the main routine (steps 653 to 655). In the above embodiment, the start timing of the image forming is controlled with reference to the drum index signal, however, a control of process which does not affect on the registration of the another image forming may be carried out by not the drum index signal but by counting the pulses of the another pulse generator.

FIG. 31 shows a scanning start interruption program 660 which is called when the first microcomputer 201 gives a scanning start signal to the second microcomputer 251. Referring to FIG. 31, upon the start of the scanning start interruption routine, a decision is made in step 661 whether the optical scanning system is ready. When the optical scanning system is not in a ready state, an alarm is displayed in step 662. When the optical scanning system is in a ready state, a timer is set for a predetermined count in step 663, an excitation pattern is provided in step 664, a current is supplied in step 665, a ready flag is reset in step 666, and then a pulse count check flag is set in step 667. Then the control operation returns to the main routine.

When a plurality of index pulses are provided every one turn of the image retainer, the period of an image reproducing cycle in the continuous image reproducing mode can be reduced with the decrease in size of the copying sheet, namely, the number of copies produced in a unit time can be increased with the decrease in size of the copying sheets. That is, as obvious from FIG. 32, in reproducing a color image in three colors, the first color image, the second color image and the third color image need to be superposed exactly on the image retainer and hence the image write operation for the three color images needs to be started at the same position on the circumference of the image retainer. However, when a plurality of index pulses are provided every one turn of the image retainer, the image write operation for the first color image in the next image reproducing cycle need not be started from the same position on the circumference of the image retainer as that for the third color image in the preceding image reproducing cycle. The image write operation for the first color image in the succeeding image reproducing cycle can be started at the first index cycle after the image write operation for the third color image in the preceding image reproducing cycle has been completed (in FIGS. 32B, 32C and 32D), which can be attained by changing the count in step 521 of the control routine shown in FIG. 26 according to the size of the copying sheet after the image write operation for the third color image in the preceding image reproducing cycle. Thus, the image reproducing cycles in the continuous copying mode can be carried out without wasting time for starting the successive image reproducing cycles at the same initial position on the circumference of the image retainer.

To reduce the period of the image reproducing cycle according to the size of the copying sheet in the continuous copying mode, the first microcomputer 201 provides necessary command signals such as for changing the count in step 521 of the control routine shown in FIG. 26 on the basis of a detection signal provided by the sheet size detecting circuit 203 (FIG. 19). Although an index signal having six pulses in one turn of the image retainer is provided in this embodiment, the number of the pulses is not limited thereto and an index signal having more than six pulses in one turn of the image retainer may be provided.

When an index signal having two pulses in one turn of the image retainer is used, the same control operation can be achieved by making $N=1$ in step 513, $N=3$ in step 521 and $N=3$ in step 530 in the control routine shown in FIG. 26.

When an index signal having thirty pulses in one turn of the image retainer is used, the same control operation can be achieved by making $N=16$ in step 513, $N=30$ in step 521 and $N=45$ in step 530 of the control routine shown in FIG. 26.

When an index signal having sixty pulses in one turn of the image retainer is used, the same control operation can be achieved by making $N=31$, in step 513, $N=60$ in step 521 and $N=150$ in step 530 of the control routine shown in FIG. 26.

In either case, the period of the prerotation process can be reduced and the fatigue of a particular portion of the image retainer can be avoided.

Naturally, the respective periods of the prerotation process and the postrotation process may be varied properly taking the characteristics of the image processing apparatus into consideration.

As apparent from the foregoing description, according to the present invention, the optical image write starting position on the circumference of the image retainer is not fixed because an index signal having a plurality of pulses is used. That is, the optical image write starting position can be moved uniformly over the entire circumference of the image retainer, so that the partial deterioration of the image retainer, namely, the photosensitive drum, is avoided and the life of the image retainer is extended.

Furthermore, since the respective periods of the prerotation process and the postrotation process can selectively and optionally be determined so that the prerotation process and the postrotation process each is completed in the least necessary time, and since the period of an image reproducing cycle can be varied according to the size of the copying sheet, the total time required for reproducing a plurality of copies in the continuous image reproducing mode can be reduced.

Still further, according to the present invention, since the respective electrostatic latent images of the separate color images of a document can be superposed on the circumference of the image retainer by writing the separate color images each from a position corresponding to the leading edge of the document in reproducing the color image of the document in a multicolor image, the electrostatic latent images of the separate color images can exactly be registered to reproduce the image of the document in a high print quality. Since the image write operation for each separate color image is started in synchronism with the rotation of the image retainer, the electrostatic latent images of the separate color images of a document can be formed on the image retainer in perfect register even if the rotating speed of the image retainer is varied due to the variation of load on the image retainer. Thus, the present invention is very effectively applicable to a color image reproducing machine which reproduces a multicolor image by superposing a plurality of separate color images through a plurality of image write cycles.

What is claimed is:

1. A color image forming apparatus for forming a color image by rotating plural times an image retainer and repeating an image forming cycle comprising at least a latent image formation and a development, said apparatus comprising means for generating reference signals corresponding to a plurality of predetermined positions on said image retainer, timing control means for controlling the start timing of an image forming cycle by using one of said reference signals corresponding to one of said positions, and the start timing of another image forming cycle by using another of said reference signals; reading means for reading an image; and signal processing means for receiving a signal from said reading means and generating a signal for forming a latent image; said timing control means being further operable to control the start of reading based on the said one reference signal.

2. A color image forming apparatus for forming a color image by superposing a plurality of color toner images on an image retainer corresponding to a plurality of color component signals, comprising; means for forming repeatingly said plurality of color toner images on a same position on said image retainer during a plurality of rotations of said image retainer, means for generating a plurality of index signals in each one rotation of said image retainer synchronous with a rotation of said image retainer, means for using an index signal out of said plurality of index signals corresponding to a start position on said image retainer of an initial toner image formation, means for controlling a start timing of another color component toner image formation to be superposed on said initial toner image in accordance with the index signal used, and wherein said selecting means can select another different index signal for a different color image forming.

3. A color image forming apparatus according to claim 1, further comprising a reading means for reading an image of a document and signal processing means for providing a plurality of kind of color component images extracted from said image of the document, wherein said reading means starts its scanning corresponding to the index signal used.

4. A color image forming apparatus according to claim 1, wherein said image forming means includes a light projection means, which starts its projection corresponding to the index signal used.

5. A color image forming apparatus according to claim 1, further comprising an encoder means for generating a plurality of clock pulses to be reference of sequential controlling a plurality of processing means, which generates said clock pulses associated with the index signal used.

* * * * *

UNITED STATES PATENT OFFICE
CERTIFICATE OF CORRECTION

Patent No. 5,023,708                     Dated June 11, 1991

Inventor(s) Hiroyuki Maruyama; Tadao Kishimoto; Toshifumi Isobe; Jun Yokobori; Tadashi Kaneko; Akihiko Tamura; Takashi Murahashi; Yoshiaki Takei; Noboru Hatakeyama; Masahiko Matsunawa; Yoshiyuki Ichihara It is certified that error appears in the above-identified patent and that said Letters Patent is hereby corrected as shown below:

ON THE TITLE PAGE:
    (75) Inventors: Hiroyuki Maruyama; Tadao Kishimoto; Toshifumi Isobe; Jun Yokobori; Tadashi Kaneko; Akihiko Tamura; Takashi Murahashi; Yoshiaki Takei; Noboru Hatakeyama; Masahiko Matsunawa; Yoshiyuki Ichihara, all of Tokyo, Japan

Signed and Sealed this

Twenty-fourth Day of November, 1992

Attest:

DOUGLAS B. COMER

*Attesting Officer*          *Acting Commissioner of Patents and Trademarks*

UNITED STATES PATENT AND TRADEMARK OFFICE
CERTIFICATE OF CORRECTION

PATENT NO. : 5,023,708

DATED : June 11, 1991

INVENTOR(S) : Hiroyuki Maruyama; Tadao Kishimoto; Toshifumi Isobe; Jun Yokobori; Tadashi Kaneko; Akihiko Tamura; Takashi Murahashi; Yoshiaki Takei; Noboru Hatakeyama; Masahiko Matsunawa; Yoshiyuki Ichihara It is certified that error appears in the above-identified patent and that said Letters Patent is hereby corrected as shown below:

Column 28, line 65, after "claim" delete "1" and substitute therefor -- 2 --.

Column 29, line 4, after "claim" delete "1" and substitute therefor -- 2 --.

Column 30, line 1, after "claim" delete "1" and substitute therefor -- 2 --.

Signed and Sealed this

Twenty-first Day of September, 1993

Attest:

BRUCE LEHMAN

Attesting Officer

Commissioner of Patents and Trademarks